B. C. STICKNEY.
COMBINED TYPEWRITING AND COMPUTING MACHINE.
APPLICATION FILED FEB. 20, 1919.

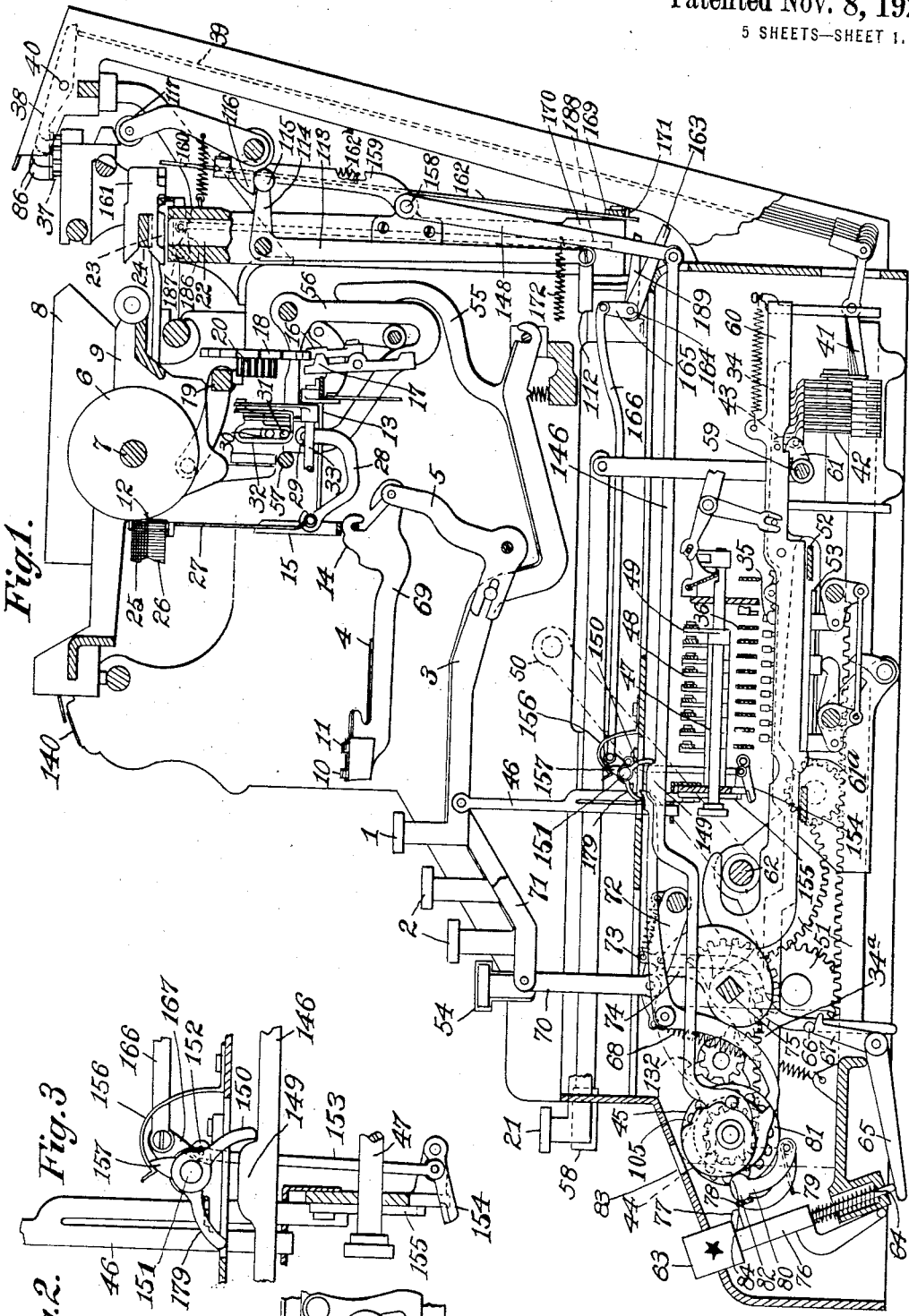

1,396,348.

Patented Nov. 8, 1921.

Inventor:
Burnham C. Stickney

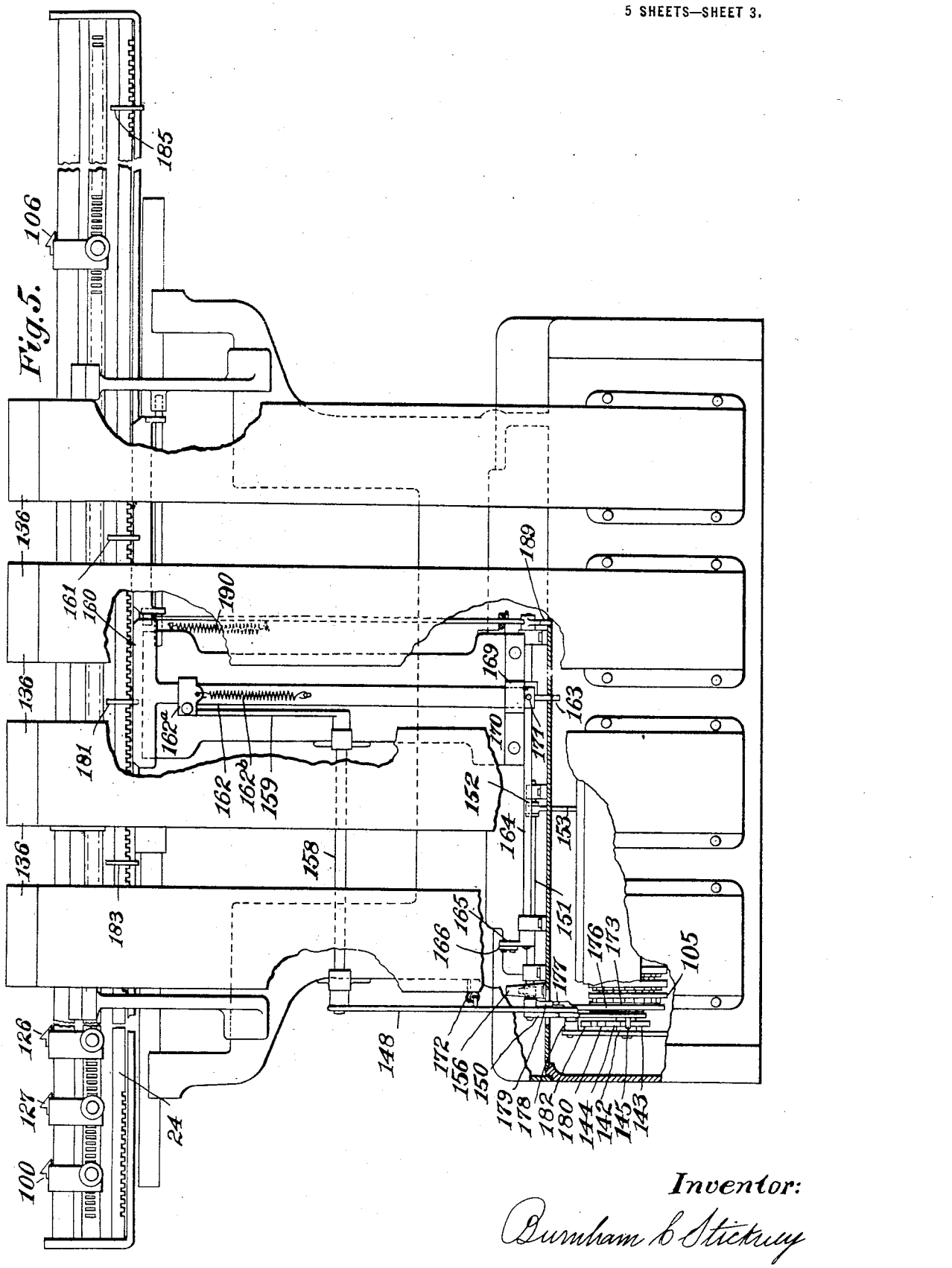

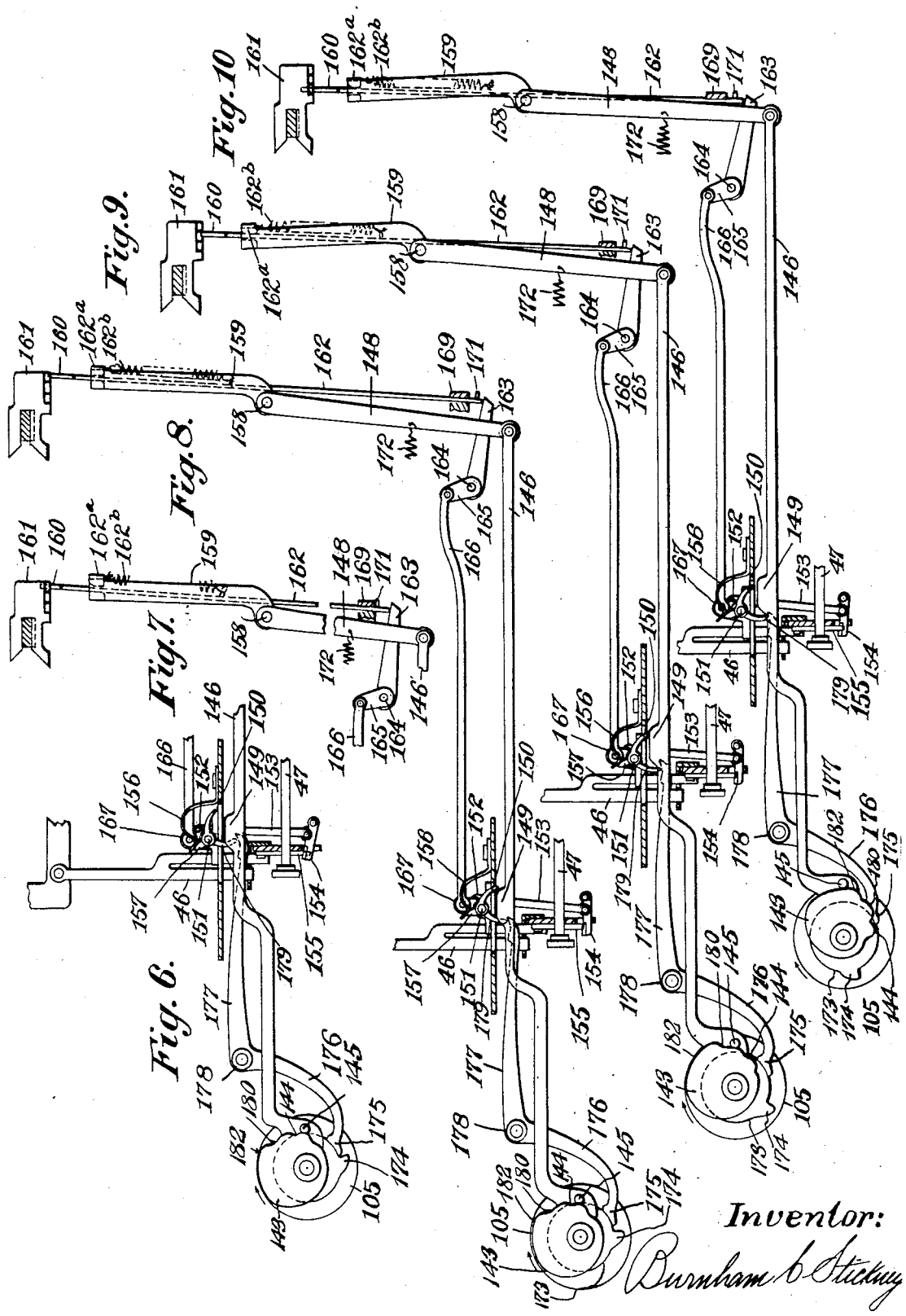

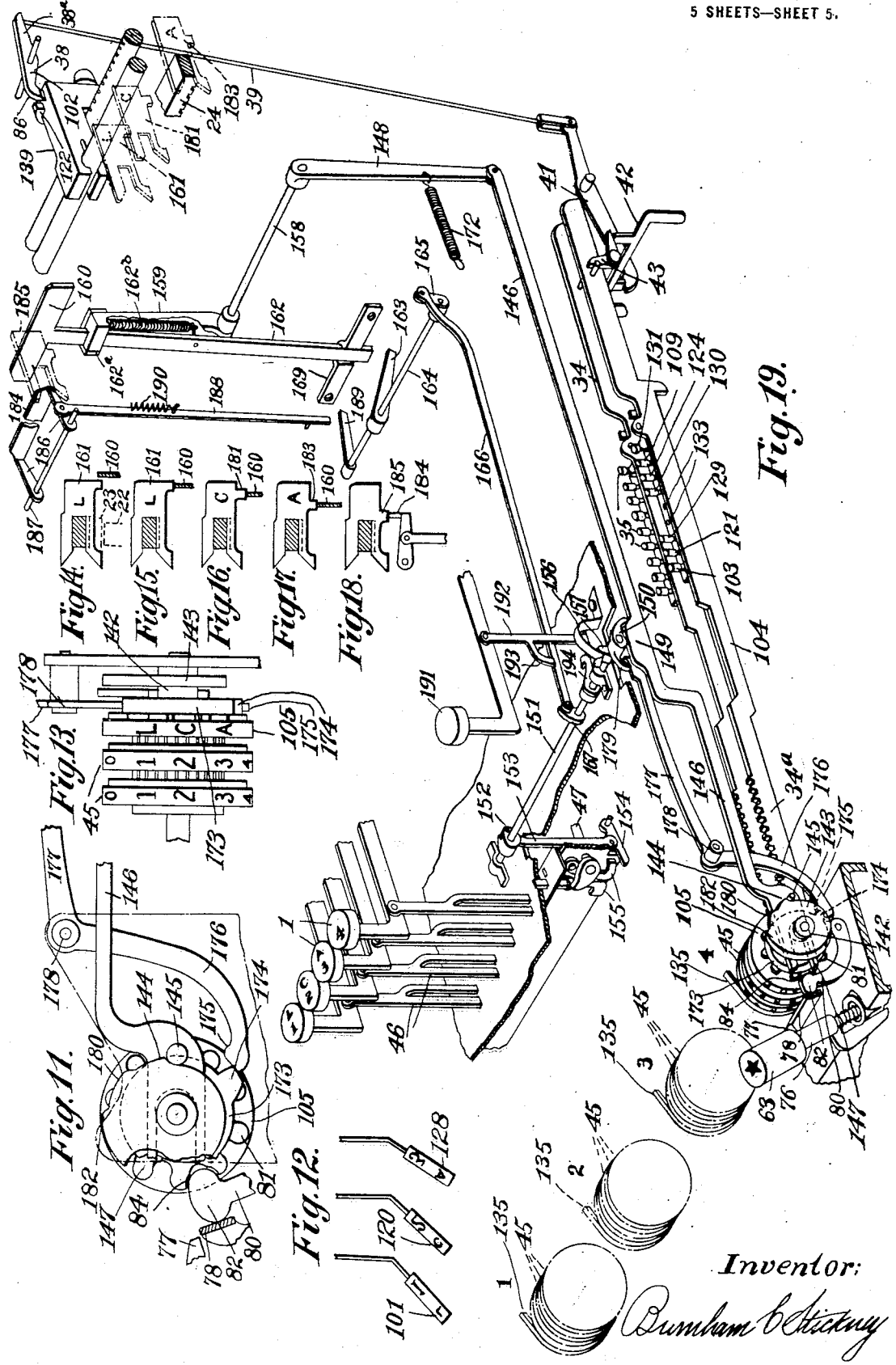

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,396,348.  Specification of Letters Patent.  Patented Nov. 8, 1921.

Application filed February 20, 1919. Serial No. 278,196.

*To all whom it may concern:*

Be it known that I, BURNHAM C. STICKNEY, a citizen of the United States, residing in Elizabeth, in the county of Union and State of New Jersey, have invented certain new and useful Improvements in Combined Typewriting and Computing Machines, of which the following is a specification.

This invention relates to combined printing and computing machines used for bookkeeping and other special purposes, and is of special value for the purpose of reducing the possibility of error which might result from the writing and computation of a number in the wrong column upon a work-sheet, as, for example, a multiplex ledger sheet where several accounts are kept separately in different columns upon the same page.

A machine of this kind is illustrated in the pending application of K'Burg, No. 257,877, filed October 12, 1918. In said application there is disclosed a special totalizer or register which is used for the purpose of adding one or more new items to an old balance in order to arrive at a new balance; separate addition of these items may, at the same time, be effected in a separate register for a purpose which will be explained. One of these separate registers may be provided for each of the individual accounts on the page; but the register which ascertains the new balance may be used for any of the individual accounts.

The method of accounting is first to type the old balance in a special column at the right-hand side of the page, and at the same time enter it in the balancing register. Then the new items are typed one under another in the selected column, these items being automatically added in said balancing register, as well as in the appropriate separate column register, if desired. The balancing register now shows the new balance; and the operative proceeds to type this new balance in a separate column. For each account there is provided upon the sheet an item column and a balance column.

Since the operative is liable to insert the items and balances in the wrong columns, and since errors arising from this source are difficult to trace, there is disclosed in said application a special wheel which is placed at the right of the units wheel in the balance register. This additional wheel may be concealed from view, but is movable one, two or three steps under the control of printing keys having means for printing special letters or characters, as, for example, "L," "C" and "A." In copying the old balance, the operative prints at the right of the entry the letter "L" for example, and incidentally controls the turning of the special or dummy wheel one step, since said dummy wheel is designed to operate in the same way as a register wheel. This is done in said application for the purpose of putting a check upon the operative, who, in subsequently writing the new balance in the appropriate column, is obliged to print an "L" type at the right of the new balance. The reason that he is obliged to do this is because the machine is in subtraction condition during the typing of such new balance, so as to subtract the same from the balancing register and therefore bring the latter to zero condition, and said dummy wheel is also turned like a computing wheel in the balancing register, during the subtraction, so as to be restored to normal position; and thus, since it results that all of the register wheels, together with the dummy wheel, resume normal positions, it becomes possible for the operative to print a clearance sign on the sheet at the end of the new balance. The clearance sign could not be printed unless the special "L" was first printed. It being thus necessary for the operative to print after every new balance a special "L," or "C," or "A," as the case may be, it becomes apparent upon inspection of the ledger sheet whether any new balance was typed in the wrong column. This is readily discernible, since all of the amounts followed by "L" should be in one column, all those followed by "C" in another column, and all those followed by "A" in another column. The printing of the special letter "C" is accomplished by a movement of the dummy wheel to the extent of two steps, so that the special "C" must be again typed in the new balance column in order to enable the dummy wheel to return to normal position and permit the printing of the necessary clearance sign. The printing of the special "A" is accompanied by a three-step movement of the dummy wheel. In this manner the operative is checked and the liability of mistakes reduced.

One of the main objects of the present invention is to provide means which may be so set when about to make an entry as to render it mechanically impossible for the operative to type the items and new balances in the wrong columns. There may be employed to this end a dummy wheel, which may preferably be similar to the wheel shown in said K'Burg application; and to said wheel there may be connected means for silencing or disabling the type-operating and computing mechanism, as, in the form herein disclosed, by locking the numeral keys against typing or adding numbers in the wrong column on the sheet. If, for example, the operative types the letter "L" at the end of the number preliminarily printed in the old balance or "proof" column, then the machine becomes locked against computing in any account except that to which is assigned the letter "L". Or, if the operative types say the letter "C" at the right of the old balance in the "proof" column of the sheet, the machine is locked against computation in any column except that which uses the letter "C". Or, if the operative types the letter "A" at the end of a number in a "proof" column, then the machine is locked against computation in any account except the account designated by the letter "A". By this means, the liability of error is largely eliminated, and it becomes practicable to employ less experienced operatives than before in typing these complicated ledger pages.

In carrying out this invention in one form, there is employed said dummy wheel, in coöperation with a special cam mechanism, which effects a locking of all the numeral keys; and these keys remain locked so long as the typewriter carriage is in the wrong adding zone; but whenever the carriage is in the selected zone, that is, in position for typing items in the appropriate account, the keys are automatically unlocked. This temporary unlocking may be done by means of tappets carried by the typewriter carriage, one for each of the accounts. Each of these tappets may be capable of depressing and holding down a key-releasing cam during the traverse of the carriage through the corresponding zone or account on the ledger sheet. These tappets may be out of line with one another, and said cam, mounted upon the framework of the machine, may be movable into position to be engaged by any of said key-releasing tappets, to the exclusion of the others. This movement of the key-releasing cam may be controlled by a wheel which is connected to said dummy wheel. It has been explained how said dummy wheel is controllable by special keys "L", "C" and "A"; the dummy wheel being turned one, two or three steps; and the special cam wheel connected thereto is turned accordingly and thereby moves said releasing cam to position to release the keys for typing in zones or accounts "L", "C" or "A", respectively. In whichever position said releasing cam may be set by said cam wheel it will be engaged by a corresponding carriage tappet at the time that the carriage is traversing the corresponding zone, and hence the keys will be released for computing in that zone; but at other points in the traverse of the carriage through the general computing field, the keys will remain locked, since said releasing cam will stand out of the path of the remaining carriage tappets.

When the new balance is typed in the appropriate account, the computing mechanism having been first set to subtract the amount thereof from the balancing totalizer and return the same to zero, together with the dummy wheel and the cams connected thereto, the keys become permanently unlocked, the releasing cam being preferably moved to an idle position out of the path of any of said carriage tappets. The letters "L", "C" and "A" appearing in the "proof" column, as well as in the other columns upon the ledger page, show that the machine must have been properly operated, and the clearance signs may give the same indications as in said K'Burg application.

There may also be provided a special key-releasing mechanism, which is always effective when the carriage is in position for writing outside of the computing zones, for instance in writing dates, numbers of policies, explanations, and folios. This key-releasing mechanism may comprise a special key-releasing cam mounted upon the frame of the machine, and a special tappet mounted upon the typewriter carriage and always capable of operating said key-releasing cam when the carriage is in the non-computing field.

A key may also be provided, having connections with the key-locking means to afford means for releasing the number keys, if locked, at the will of the operative.

Other features and advantages will hereinafter appear.

In the accompanying drawings,

Figure 1 is a sectional side elevation, taken from front to rear and about centrally, of a combined typewriting and computing machine of the well-known Underwood-Hanson type. In this figure, the numeral keys are released. The general operator and other parts are shown in their normal positions.

Fig. 2 is an enlarged front, fragmentary elevation, to illustrate some of the key-operated devices, and also the means for locking the keys against depression.

Fig. 3 is a fragmentary sectional side elevation of parts seen in Fig. 2, and also illustrating a portion of the mechanism for automatically locking and unlocking the keys.

Fig. 4 is a plan of the machine, with parts broken away to disclose underlying parts. This figure shows a ledger-sheet in the machine, with entries made in various individual accounts thereon.

Fig. 5 is a rear elevation of the machine, with parts broken away for the sake of clearness.

Fig. 6 is a sectional side elevation of a portion of the key-locking and releasing mechanism, showing the condition brought about through the printing of a special type on the sheet and the advance of the dummy wheel one step; the keys being locked, and the parts having been operated to set the key-releasing device for use in the first computing zone, that is, columns 88 and 91 at Fig. 4.

Fig. 7 is a fragmentary view of key-releasing parts of the rear of the machine, and is to be read in connection with Fig. 6, which shows corresponding parts at the front of the machine. Fig. 7 shows the key-releasing cam in position for operating in the first computing zone, corresponding with columns 88 and 91 of Fig. 4.

Fig. 8 corresponds with the parts seen in Figs. 6 and 7, but shows the keys as temporarily released by the action of the releasing tappet upon the releasing cam.

Fig. 9 is a view similar to Fig. 8, but showing the dummy wheel as having been advanced two steps instead of one, this being the result of the printing of the special character "C" on the work-sheet. The releasing cam coöperates with the second tappet upon the typewriter carriage, for temporarily releasing the keys while the carriage is in the zone for typing in columns 89 and 92 on the work-sheet.

Fig. 10 is a view similar to Figs. 8 and 9, but illustrating the dummy wheel as having been advanced three steps and the releasing cam as brought to position to be depressed by the third releasing tappet on the carriage; this being done by the movement of the carriage to a position to write in columns 90 and 93 on the work-sheet.

Fig. 11 is an enlarged side elevation of the key-controlling cam wheel which is fixed to the dummy register wheel; the cam wheel having one cam for each of the three computing zones; the cams arranged in succession so as to be brought into use respectively by a one-step, two-step and three-step advance of the cam wheel.

Fig. 12 shows the characters "L," "C" and "A" as being in the form of special types on the same type blocks as the numerals "1," "2" and "3," so that the numeral keys "1," "2" and "3" may be employed for writing these special characters, and, at the same time, for bringing about the corresponding rotation of the dummy wheel, as set forth in said K'Burg application; but it will be understood that these special characters do not need in all cases to be placed upon the same types and keys as said numerals.

Fig. 13 is a front elevation of the parts seen at Fig. 11.

Fig. 14 shows the temporary releasing tappet for the "L" zone, marked 88 and 91 at Fig. 4. Said releasing cam is normally back out of reach of any tappet, as here shown.

Fig. 15 is the same as Fig. 14, but shows the releasing cam as moved forward and depressed by the "L" tappet as at Fig. 8.

Fig. 16 shows a "C" tappet for releasing the keys while the carriage is in position to write in the "C" columns, marked 89 and 92 at Fig. 4, and the releasing cam as having been shifted forwardly and depressed by this tappet.

Fig. 17 shows the releasing tappet for zone "A," comprising columns 90 and 93 at Fig. 4, and the releasing cam as having been shifted over and depressed by this tappet.

Fig. 18 shows still another tappet as depressing a special release bar which is always in position to be engaged thereby to release the keys temporarily whenever the carriage is in the non-computing zones, comprising columns 95 to 98 at Fig. 4. All the tappets at Figs. 14 to 18 are cut away, so as not to be engaged by the decimal stops 22, although these tappets may be adjustable along the same bar 24 that carries the column stops.

Fig. 19 is a perspective front view of some of the indexing mechanism, the dummy-wheel mechanism, and key-locking and releasing devices, the parts being shown in normal positions.

In the Underwood bookkeeping machine (one form of which is disclosed in the application of Adolph G. Kupetz, Serial No. 144,323, filed January 25, 1917, now Patent No. 1,356,072, dated October 19, 1920) numeral keys 1 and alphabet keys 2 mounted on the front ends of key-levers 3, swing type-bars 4 by means of sub-levers 5 upwardly and rearwardly against a platen 6, revolubly mounted by means of an axle 7 in a shift frame 8, which forms part of a carriage 9. As the type-bars 4 approach the platen, upper or lower-case type 10 or 11 thereon print through the usual bichrome ribbon 12, and concomitantly actuate a universal frame 13 by means of heels 14 on the type-bars 4, which strike against a vibrating segment 15, forming part of the frame 13, and cause dogs 16 and 17 to alternately engage the escapement wheel 18, thus permitting the carriage 9 to be drawn along a step at a time. To draw along the carriage, there is provided the usual spring barrel, not shown, and the carriage is held against the tension of said barrel by means of a pivoted rack-bar 19, engaging the pinion 20, connected to the escapement wheel 18.

The usual tabulating keys 21 may free the carriage from the pinion 20 in the usual manner, and lift the denominational stops 22 into the path of column-stops 23, settable on the usual rack-bar 24 on the typewriter carriage. In order to vary the color of printing from the black stripe 25 of the ribbon 12 to its red stripe 26, the ribbon-carrier 27 may be given a variable throw by the vibrator 28, which is pivoted as usual at 29 on the shift frame, and comprises two pins 30 and 31, adapted to be engaged with one or the other side of a shiftable housing 32, said housing being adapted to be shifted by the usual rock-shaft 33.

The computing mechanism includes the usual rack-bars 34, carrying indexing pins 35, to be set by pin-setting bars 36, controlled by the numeral keys 1. The normal position of said rack-bars is such as to position the pins out of coöperative relation with said pin-setting bars. In order to bring pins 35 within range of the pin-setting bars 36, there is provided on the typewriter carriage a settable denomination-selecting device in the form of a cam or dog 37, which as the typewriter carriage travels along, lifts *seriatim* the front ends of jacks 38 (suitably spaced at 38ª for pointing off). Each jack is connected to one of the rack-bars 34 with the result that whenever a jack 38 is raised, the rack-bar 34 belonging to that jack is shifted slightly forward, thus bringing its pins 35 in register with the pin-setting bars 36. The connections for effecting this usually include a series of rods 39 at the rear ends of the jacks, behind the pivot 40 on which the jacks are journaled, and each rod 39 is connected to its rack-bar by means of a bell-crank lever 41 which is effective through a transposition device 42 to rock a bell-crank 43 to shift its rack-bar sufficiently forward to make its pins aline with the pin-setting bars, which have racks 34ª to engage the pinions 44 on the computing wheels 45.

The key-operated pin-setting connections usually include a pendant 46 on each numeral key 1, to rotate a rock-shaft 47 comprising an arm 48, so that said arm will rock a linkage 49, comprising the pin-setting bar 36 belonging thereto, and depress the pin-setting bar to cause the pin on the displaced rack-bar 34 beneath it to be depressed or set. After several pins 35 have been thus set, one on each rack-bar, to correspond with the digits typed, the computing wheels are operated, each to an extent determined by the pin 35 which has been set on its rack-bar. To effect this, the typist draws on a handle 50, which, by means of the usual connections 51, drives forwardly a general operator 52, thus driving the rack-bars and registering or accumulating the number in the computing wheels. On the return movement of the handle, the general operator returns to its normal position, and, at the same time, by means of the usual connections restores the rack-bars idly to their normal positions, and actuates the usual pin-restoring mechanism 53.

The mechanism so far described may be of the usual Underwood bookkeeping machine type, or of any desired type. The usual shift-key 54, when depressed, is adapted to raise the platen 6 from the normal position, in which the lower-case types print thereon, into the upper position in which the upper-case types print thereon. The connections for accomplishing this may include the usual arm 55 adapted to be effective on the usual bell-crank frame 56, which includes the rail 57 on which the carriage runs and by which it is raised.

The mechanism also includes a subtraction-key 58, which, when depressed, is adapted to rock the usual rock-shaft 59, thus freeing a subtraction-setting bar 60 from the dog 61 which normally holds it. This subtraction-setting bar alters the connections between the numeral keys and the pin-setting bars, so that complementary subtraction may be effected, and, at the same time, sets all the "9" pins 35 by means of connections of the usual type, which may be substantially like those shown in the patent to Hans Hanson, No. 1,278,812, dated September 10, 1918. In addition to the above functions of the subtraction-setting bar, other settings are effected thereby to enable subtraction to be automatically performed through the operation of the dials in the same direction as for addition, this being more fully disclosed in said Hanson patent. Among other things, the general operator may restore the mechanism automatically to addition. In order that it may accomplish this end, the subtraction-setting bar 60 is provided with a lug 61ª to be engaged by the general operator 52 at the end of its forward stroke, and through which it may be restored to its normal position.

In addition to the features described above, the present mechanism is shown as including one form of the well-known star-printing device, adapted to be operated to indicate that the numeral wheels in any register are "cleared", viz., stand at "0". Said star-printing device includes key 63, which, when depressed against the tension of the spring 64 which normally holds it upward, rocks a bell-crank 65, so as to free a pin 66 normally restrained by the upper end 67 of the bell-crank, with the result that a spring 68 is released to operate a star-printing type-bar 69. The connections for accomplishing this include a pendant 70 connected to the lever 71 which operates the star type-bar 69, the said pendant being guided at its lower end by a pivoted link 72, so that a second pendant 73 pivotally mounted on said link will have the pin 66 thereon drawn down against the arm 67 by the spring 68 which is anchored in the projecting end of the link 72. After the star-key 63 has been operated, the spring 68 is retensioned by a cam 74 fast to the usual carry-over drive-shaft 75, which is actuated by the return of the general operator.

In order that the star-key 63 may only be operated when all the wheels of its register stand at "0", the star key-bar 76 includes a lug 77 which stands above a locking bail 78, said bail being normally under tension of a spring 79, tending to turn it from locking position. The bail is, however, normally held in locking position by means of any one of a series of detents 80, which are adapted to coöperate with the usual computing-wheel driving-teeth 81 of the carry-over mechanism. When any detent is seated between any ordinary teeth 81, its head 82 projects far enough outwardly to swing the bail 78 beneath the lug 77. When, however, any computing wheel shows its "0" at the sight-opening 83, the detent 80 of that wheel sinks in between a deeply cut-away portion 84 of the teeth 81 which are then adjacent the detent 80. From this it follows that when any computing register has all its wheels showing "0" at the sight-opening, all its detents 80 will engage cut-away portions 84, and, therefore, permit their bail 78 to stand clear of the lug 77 and allow the star-key 63 to be operated. The details of this mechanism are more fully set forth in the patent to Richard F. Hoyt, No. 1,256,309, dated February 12, 1918.

So far the machine has been described for the most part as if it only comprised a single set of computing wheels 45. In the present disclosure, however, there are four sets of computing wheels 45 forming registers which, for convenience, may be numbered 1, 2, 3 and 4, and each wheel in each register has its own rack-bar 34, and its own rack 34ª, and its own jack 38. The various registers in the present disclosure are adapted to be selectively operated by the denomination-selectors 37, of which there are several, and, for this reason, the front ends 86 of the jacks 38 stand in different planes,—one plane for each register. One form of this structure is more fully set forth and described in the patent to E. G. Griffith, No. 1,263,881, dated April 23, 1918. The denomination-selectors 37 are set in planes corresponding to the jacks it is desired to have them operate.

As herein illustrated, the selectors are so set that they are adapted to enable bookkeeping entries to be made on a ledger-sheet 87 having three columns 88, 89 and 90 of original entry for different accounts, columns 91, 92 and 93 of individual balances for said accounts, and a "proof" column 94, which is common to all the accounts. In addition to the above-named columns which are for computing, the ledger-sheet 87 also includes a date column 95, an item-number column 96, an explanation column 97, and an index-number column 98.

This particular type of ledger-sheet may be used where different kinds of accounts are kept by a centralized system of bookkeeping, the particular instance herein shown being that of a group of insurance companies having a single set of books kept at a single office, 87 representing a ledger-sheet kept up to date in such central office.

The business represented on this sheet are the John Doe Life Insurance Co., which has its account kept, so far as items are concerned, in column 88, and, so far as the current balance is concerned, in column 91; the Doe Casualty & Surety Co., which has its account kept, so far as items are concerned, in column 89, and its current balance in column 92; and the Doe Auto Insurance Co., which has its account kept, so far as items are concerned, in column 90, and its current balance in column 93. The "proof" column 94 is similar to the "old balance" column, now employed in a number of well-known systems of bookkeeping using printing computing machines, whereby the statements are kept constantly up to date by daily entries. The sheet 87 is the ledger-sheet for Jane Doe, Agent, who is supposed to act as agent for all these companies, and necessarily must have a separate account with each company.

Although the invention has been disclosed as applied to a machine having four registers, numbered 1, 2, 3 and 4, respectively, it is in no manner restricted to use in connection with such a machine, since, as will hereinafter appear, all of the computations necessary to make up a ledger sheet 87, as hereinafter more specifically described, may be effected by use of a single register, such as that numbered 4. For example, the various items and totals indicated on sheet 87 (see Fig. 4) relate to the account of the agent "Jane Doe" with the various insurance companies, indicated at the head of columns 88 to 93, inclusive. There would ordinarily be a large number of different agents having similar accounts with the same companies. When the additional registers numbered 1, 2 and 3 are employed, each register may be assigned to one of the three companies mentioned, in which case the items relating to accounts of each company, with all of the various agents, may be accumulated and registered in its respective totalizer. In this manner, the net totals of credits and debits for each of the respective companies relating to accounts with all of the different agents employed will be accumulated and may, at any time, be read from its respective register, whereas the net totals of debits and credits of any particular agent with the various companies will be found upon the respective sheet 87, on which that agent's account is recorded.

In making the entries on the ledger-sheet 87, the typist enters the date and the policy number in columns 95 and 96, together with any memorandum in column 97, and enters a cross-reference number in column 98. Then the items are entered up in the appropriate column 88, 89 or 90.

On the work-sheet 87, the first two entries in column 88, under date of "6/6", and their total, 51.40L*, in column 91, involve the opening of an account of Jane Doe, for the John Doe Life Ins. Co., and since opening an account is not one of the ordinary daily routine operations of bookkeeping, the description will be directed first to the third entry, viz., the one under date of "6/10". Before beginning to make the third entry, the typist brings the typewriter carriage to the point where the printing point will be in the "proof" column 94. To prove that register 4 is clear at this time, the typist prints the star 99. The typist then proceeds to write the old balance $51.40L shown in column 91. This will be added in only one register, namely, register 4; the denomination-selector 100 being effective at this position of the typewriter carriage to cause the digits written by the typewriter keys to be computed in said register 4. In typing the "L" after the $51.40, a controlling mechanism is brought into play, to control the operation of the star-key 63. There is provided a special "L" type 101 in the upper-case of the type-bar which is operated by the "1" numeral key, so that if the shift-key 54 is depressed and the "1" key is then actuated, the special "L" will be printed. This is printed immediately following the printing of a digit in the units place. An extra jack 102 for the fourth register is operated by the denomination-selector 100 at this time, to cause said "1" numeral key to effect the setting of "L" pin 103 on a special rack-bar 104, the latter being adapted (when the general operator is subsequently put into action) to turn a special blank or dummy computing wheel 105. This dummy wheel is provided with teeth 81 and a cut-away portion 84, like the computing wheels 45 in register 4. Since this dummy wheel 105 is provided with a detent 80 identical with the detents 80 for the computing wheels, it will block the operation of the star-key whenever it is turned away from its normal position. It will presently be shown that when any number is subtracted out of totalizer or register 4, by typing such number elsewhere on the ledger-page, it will be necessary to type the special "L" also, so that the dummy wheel may be turned to normal position and permit the clearance sign to be printed. It is the enforced printing of this special "L" after the number that enables the reader to see whether or not the number was entered in the proper account.

The keys having been operated as just explained, the typist proceeds to actuate the general operator, thereby causing digits 5, 1, 4, 0, and the letter "L" to be registered on the computing and dummy wheels, respectively, in register 4. It will be observed that this entry in column 94 is an exact copy of the entry in column 91, except for the fact that the star is printed before the number in column 94, to indicate that the register 4 was clear when beginning to write in that column. It will also be observed that this writing in the "proof" column has entered in register 4 the old balance. This old balance is to be added to any new items that are to be entered in column 88, in order to obtain a new balance. This addition is to take place in said register 4; although the new balance (when ascertained) will be placed in a different column from 94.

Having entered the old balance on register 4 together with the "L", as just explained, the typist now writes on the next line, beginning with the date 6/10 in column 95, continuing with the policy number JA13568 in column 96. In column 98 the folio number 2678 is inserted, which may be the number of the agent's invoice or report. The typist then enters in column 88 the single item $39.25, forming the only item charged for that day under column 88. In order to effect a computation in register 1 while doing this writing, there is provided for said register 1 a denomination-selector 106 which is adapted to cause the number $39.25, while being written, to be set up on the index pins which coöperate with register 1. In order to add this same item onto the old balance $51.40 in register 4, so as to find the new balance, as aforesaid, there is provided a denomination-selector 107, which forms part of the means for causing the computing of the item $39.25 in register 4, wherein it is added to the old balance of $51.40 which was already entered in said register 4, as above explained. Thus it comes about that the $39.25 written in column 88 is computated simultaneously in registers 1 and 4. Said register 4 now shows the new balance of 90.65 (51.40 plus 39.25).

This item of 39.25 is the sole item to be written in column 88 for this day; and for the purpose of recording the new balance, the typist now brings the carriage of the typewriter to the point where writing will be done in balance column 91. This brings to effective position a denomination-selector 108, for the purpose of causing a number written in column 91 to affect register 4. Since it is desired to remove the new balance from the balancing register 4 and leave it at "0", the typist (unless the machine is provided with an automatic subtraction-stop, of which one form is shown in the aforesaid application of Adolph Kupetz) depresses the subtraction-key 58, to cause the writing of said new balance in balancing-column 91, to occasion the subtraction of that balance out of the balancing or balance-finding register 4.

After copying the last figure of the new balance $90.65 in said balanced-column 91, the typist depresses the shift-key 54, and writes the "L" in the upper case of key "1", thus setting a "subtraction" "L" pin 109. The typist then actuates the general operator. The actuation of the general operator at this time subtracts out both the $90.65 and the "L" setting, thus leaving the register 4 at "0", and with the blank wheel so positioned that its detent releases the star-key 63. The typist then depresses the star-key 63, thus printing the star 110 after the "L" in column 91, indicating that the balance has been correctly copied out of the balance-finding register 4 into said column. It will be observed that every balance in column 91 has "L" printed with it, and that all corresponding balances that are written in proof-column 94 are to have the "L" written with them, thus making the "L" a characteristic mark or symbol associated with the balances which belong to the account whose daily balances are shown in column 91.

As will be fully explained later, a different symbol and a different locking combination are provided for the other accounts, that is, for columns 92 and 93, thus rendering any transposition of balances to the wrong columns instantly obvious and providing an individual locking star-key device for each column.

Before describing other columns, however, attention is called to the fact that in opening an account, such as is illustrated under the date 6/6 in column 95, the procedure varies, in that while typing the special "L," the non-add key 111 is employed, as it is not desired to block the star-printing device by means of the dummy wheel when opening the account. This is illustrated as follows. After writing the date 6/6 in opening the account, and writing the policy number JA13568 and the folio number 16578, the typist writes in the item $39.25; then coming back to columns 95, 96, 97 and 98, again writes in date, policy number, explanation, and folio, and then in column 88 writes in the item $12.15, the items $39.25 and $12.15 being added to any standing balance for the John Doe Life Ins. Co., which may have been previously accumulated in register 1, as a result of entries made on the ledger-sheets of other agents for the same company. In fact, during the writing of these items, the denomination-selectors 106 and 107 are effective and the items are hence duly computed in registers 1 and 4. There being no further item to be registered at this time in column 88, the typist subtracts out of register 4 by copying into balance-column 91 the total $51.40 shown in balance-finding register 4. Then the typist depresses the non-add key 111 and prints the "L." The reason for actuating the non-add key at this time is to prevent the setting of an "L" pin and consequent turning of the dummy wheel 105, since such turning would prevent the operation of the star-key 63. Then the typist depresses the clearance key 63 to print the star, shown at 109$^a$.

The non-add key 111 may be of the usual type in which it operates a horizontal rod 112 to swing rearwardly the long lower end 113 of a bell-crank 114, which carries at its outer end 115 a follower coöperating with the cam 116, the connections being such that the rearward pushing of the rod 112 causes the follower 115 to lift the cam 116 and rock the silencing rolls 117 rearwardly to a position in which they no longer support the denomination-selectors 37.

For computing in register 2 the numbers written in column 89, there is provided a denomination-selector 118, which is adapted to coöperate with the computing device of register 2. In the example shown herein, there are two items in column 89 under date 6/15 computed in registers 2 and 4, precisely as the items in column 88 were computed in registers 1 and 4, except that denomination-selectors 118 and 119 are now effective. The total 216.29 of these items is then copied into column 92 from register 4. During this latter operation, the total is substracted from register 4 by a denomination-selector 122, precisely as items in column 91 were subtracted from that register by denomination-selector 108. It will be noted that the balance 216.29 in column 92, instead of having a letter "L" associated therewith, has a letter "C" associated therewith, the utility of which will be described below. (At this time the letter "C" was printed while the non-add key was effective, inasmuch as this opened the account with the first balance in column 92.) It is further pointed out that the letter "C" is in the upper case 120 of the numeral type "2," with the result that the actuation of the numeral key "2," when the special rack-bar 104 is made effective by the selector 119, normally causes the setting of a "C" pin 121 on the rack-bar 104 and in consequence the dummy wheel is duly turned two steps, and therefore can only be restored to normal position through a second printing of the special "C," as will be understood from the foregoing explanation of the special "L."

Under date of 6/25 in column 89, is shown a credit in red. To make the proper entries in such a case, the typist first copies the old balance 216.29C from balance-column 92 into proof-column 94. This old balance is at the same time carried into register 4 with the aid of the denomination-selector 100; and this operation includes the registration of the "C" pin 121. Since the 10.00 is to be entered in red, and is to be subtracted from register 2, the typist, after copying the 216.29C, aforesaid, sets the machine so that the column 89 the 10.00 is written and substracted, both from No. 2 register and No. 4 register, leaving register 4 reading 206.29C. The typist then copies in column 92 the 206.29 from register 4, subtracting it out to bring said register to "0," and then writes the "C" in the upper case of key "2," and then actuates the general operator. This restores register 4 to "0," and restores the dummy wheel to normal position, thus making it possible to operate the star-key 63 to print the star 123 in column 92. It should be noted that in writing the "C" in column 92 subtractively, the pin set on rack-bar 104 is the pin 124 complementary to the pin 121 set additively.

In the above description, the entries under 6/19 were omitted, these being in columns 90 and 93. The items in column 90 are written and computed precisely as the items in column 88, except that those in column 90 are added by means of denomination-selectors 125 and 126 in registers 3 and 4, respectively. Their total 255.53 then appears in register 4 and is copied out of said register into column 93 with denomination-selector 127 effective, and the machine set at subtraction. This subtracts the number 255.53 out of register 4, leaving said register standing at "0." In this column, there is printed next the units digit, a letter "A" by the upper-case type 128 of the numeral type "3" as a symbol of the column. This symbol plays precisely the same part for this column that the symbols "L" and "C" play for columns 91 and 92, respectively, and the printing of this symbol "A" in the proper place will, in the normal operation of things, set an "A" pin 129 in addition, and a complementary "A" pin 130 in subtraction. These pins are adapted to turn the dummy wheel 105, precisely as did the "C" and "L" pins, except that the "A" pins turn the wheel to a different extent and thus are effective to lock the star-printing key 63 at other positions of the dummy wheel 105. In other words, the "L," "C" and "A" pins play the part of a selective locking device for the star-key 63, being effective through the dummy wheel 105. It should be noted, however, that the balance actually shown in column 93 was written with the non-add key effective at the moment of writing the "A," in order to avoid the setting up of an "A" pin in opening the account in columns 90 and 93, for the same reason that the setting up of a "C" pin was avoided in columns 89 and 92, and the setting up of an "L" pin was avoided in opening an account in columns 88 and 91.

Since the pin 109, which is set during the printing of an "L" with the machine set for subtraction, is the complement of the pin 103, set during the printing of an "L" with the machine set for addition, the two movements of the dummy wheel which result from the printing of an "L" with the machine set for addition followed by the printing of the same character with the machine set for subtraction will together equal one complete rotation. As the machine is clear before the printing in addition the dummy wheel will stand in its clear position after the two printings have been effected. The pins 124 and 130 being complemental to the pins 121 and 129, respectively, the same will be true when printing either a "C" or an "A." Starting with the machine clear, the printing of either of these characters with the machine set for addition followed by a printing of the same character with the machine set for subtraction, will leave the dummy wheel in its normal clear position.

In addition to the above-described method of entering new accounts, the machine set forth in said K'Burg application may be used in a different manner, in which the use of the non-add key, when printing a special zone-indicating character, will be unnecessary. This alternate method of using the machine may be illustrated in connection with the entering of the new account between Jane Doe and the John Doe Life Insurance Company, under date of "6/6," as illustrated at Fig. 4.

The first step, when opening a new account in accordance with this alternate method, would be to position the typewriter carriage so as to print the clearance character 99 in the proof-column 94 to indicate that the machine is clear. This might be printed either in the line in which the first entry is to be made, or in the immediately preceding line. Following the printing of this clearance character, the special zone-indicating character, corresponding to the zone in which the new entry is to be made, should be printed. Since, in starting a new account, there would be no old balance to be recorded, there would be no numbers registered between the clearance-printing character and the zone-indicating character as printed in the proof-column. The printing of the zone-indicating character ("L" in the present instance) serves as a check to prevent the improper entry of the new account in a zone other than that represented by said character. The typewriter carriage should next be positioned for entering the items 39.25 and 12.15 in column 88, which, as in the previously described mode of operation, will be added to any total previously accumulated in register 1, and the total of these two numbers will, at the same time, be registered in totalizer No. 4. The carriage will then be positioned for writing the last-mentioned total in the balance column 91.

In order that the machine may be cleared during the writing of the balance total, it will, as before, be set for subtraction, after which, on depressing the proper keys, the total 51.40 may be typewritten in said balance column 91, and, at the same time, the number wheels of the No. 4 register will be returned to "0." Should an attempt be made at this time to print a clearance character, it will be found that the clearance key for the No. 4 register is locked by the special dummy wheel, which was advanced to locking position on printing the character "L" in the proof-zone 94. In order to clear the machine, the operative will, therefore, print an "L" after the total 51.40 in the balance column 91, and, since the machine is set for subtraction, this will restore the special dummy wheel to its normal position, after which the clearance character 109$^a$ may be printed to show that the machine is clear. When using the machine in this manner, the appearance of the clearance character and the special zone-indicating character in the proof-column, without any numbers being printed therein, would signify the opening of a new account.

It will be observed that the dummy wheel 105 may be in many respects treated precisely the same as if it were a computing wheel of the ordinary sort, thus making it unnecessary to introduce extensive changes into existing machines. For example, in carrying over in complementary subtraction, the dummy wheel may play the part of the units dial wheel, so far as that wheel is advanced by the automatic unit-adding mechanism. It, therefore, operates a carry-over wheel 132 of the usual type, and its pin-bar is provided not only with the "L," "C" and "A" pins 103, 121 and 129, but with their complementary pins 109, 124 and 130, and with a "9" pin 131, which is adapted to be set with the other "9" pins in complementary subtraction, to give the necessary revolution to the dummy wheel 105 in case said wheel is to be turned a full revolution in subtraction. Since a standard rack-bar of the type of 34 is used for the rack-bar 104, the openings 133 may have their pins removed to minimize the likelihood of inadvertent driving of the rack-bar 104.

It will be noted in Fig. 2 that there is a star-key provided for each register 1, 2 and 3, as well as for register 4. These star-keys are not likely to confuse the typist since they are normally locked because each of the registers 1, 2 and 3 usually contains the total accumulated items for the branch of the business which it represents. The star-keys are included with registers 1, 2 and 3, because they may be used to indicate on the sheet that those registers are individually balanced, as would be the case in taking off a profit and loss trial balance. Moreover, they may be used where the machine is used for other work in addition to the specific kind of bookkeeping described above.

The dummy wheel 105 may be so positioned that its periphery is concealed, as shown at Fig. 4. For convenience in setting up and adjusting the mechanism, this wheel may have symbols "L," "C" and "A" marked on its periphery, as shown in Fig. 13. For convenience in reading the wheels 45, they may be spaced off by markers 135 corresponding to the pointing-off spaces between the jacks 38.

Inasmuch as the register 4 is used for entering balances pertaining to accounts with but one agent at a time, the number of wheels needed in it is not so great as the number of wheels needed in registers 1, 2 and 3, in which are accumulated the balances pertaining to accounts with all agents. In building machines, advantage is taken of this fact which enables the employment of standard parts, such as standard transposition mechanisms 42 and standard casings 136 for the jacks 38. In utilizing these standard parts, the connections may be so arranged that the jack 102 and the rack-bar 104, which would otherwise be used for the units computing wheel, may be utilized for the dummy wheel 105; the jack, rack-bar, and computing wheel which would otherwise be used in computing tens may be used in computing units, and so on throughout the various orders, the capacity of the register being thus reduced to the extent of one denominational order. To enable this to be done without entailing the reconstruction of the No. 4 housing 136, and the No. 4 transposition device 42, the denomination-selector 119 is offset one letter-space to the right, as will be seen by comparing the selectors 125 and 119. The other No. 4 selectors, numbers 107, 122, 126 and 127, are similarly offset. To enable this offsetting to be done in a substantially automatic manner by the typist in setting up the mechanism, according to the usual typewriter-scale 140, the notch 137, which is customarily used in positioning the denomination-selectors for the No. 4 register, is offset to the right one letter-space from the corresponding position of the coresponding notches 138 for the number 1, 2 and 3 registers. This enables the typist to set up the machine just as if all parts were of the standard type hitherto used, the only point to be remembered being that the No. 3 selector 125 is positioned by the notch 138 for the No. 3 register, and that the mounting 139 of the selectors 119, 125, is not the usual mounting for a "3—4 double selector," but has one selector-dog offset.

The features so far detailed are substantially disclosed in said application of K'Burg, No. 257,877. The novel features hereinafter explained and claimed relate to means for preventing the entry of an item in the wrong account; and while they are valuable in connection with the K'Burg device, still it is obvious that they may be used in other connections.

It has been explained that after the old balance 51.40L has been typed in the proof-column, the operator puts the carriage to position to type an item in column 88, which will usually appear upon the following line in said column. There will now be described means whereby the typing of the "L" in said proof-column automatically prevents the computing and entry of an item in any account except the "L" account, viz., columns 88 and 91. To this end the keys are locked whenever the carriage occupies such position that typing can be done in any other account, viz., in columns 89, 92, 90, 93. This locking of the keys is controlled by the key that prints the "L," that is, in the present illustration, by the numeral key "1," which carries the "L" as an upper-case character.

The mechanism whereby this "L" key effects the locking or silencing of the numeral keys, to prevent entering items in the wrong accounts, is preferably connected to the dummy wheel 105, which is turned one step by the general operator, after the printing of the special "L" type. Upon said dummy wheel is fixed a disk 173, upon the right-hand side of which is a hub 142, to which is fixed a cam wheel 143, which performs various functions, one of which is the locking of the numeral keys. This wheel has an edge cam 144 which engages a pin 145 provided upon a horizontal thrust-rod 146, which may be guided at its forward end by means of a fork 147 resting on said wheel-hub 142, and at its rear end by means of a pivoted pendent arm 148 upon which it is suspended. Between its ends this thrust-rod carries a cam 149 which lifts an arm 150 provided upon the right-hand end of a horizontal rock-shaft 151, thereby lifting an arm 152 provided upon the other end of said rock-shaft, and by means of a pendent link 153 lifting a pivoted dog 154 up to crowd between a set of key-locking pendants 155, which are usually provided in the Underwood-Hanson machine for locking the numeral keys 1 at certain times. This dog is normally held in key-locking position by means of a double-acting spring 156, which may be of any suitable type and mounting, and is shown conveniently as engaging a double beveled cam or arm 157 upon said rock-shaft 151, so as to be capable of holding the key-locking dog 154 either in working position, Fig. 6, or in its normal idle position, Fig. 19. It will be apparent, on comparison of this part of the mechanism as illustrated in Figs. 1 and 3 with the same part as illustrated in Fig. 6, that the cam 149 is not relied upon to drive the arm 150 continuously until the dog 154 reaches its effective locking position. The cam 149 merely drives the arm 150 until the double cam member 157 passes its dead-center position with respect to the engaging portion of the spring 156. The spring 156 acting upon the opposite side of the double cam member 157 is then effective to continue the movement of the member 157 and the connected rock shaft 151, link 153 and dog 154, so as to bring said dog to its effective locking position. The parts will then appear, as illustrated in Fig. 6, with a wide separation between the arm 150 and the cam 149. The rock shaft is therefore free to be rocked, by means hereinafter to be described, in a return direction, sufficiently to remove the dog 154 from its locking position without causing the cam member 157 to pass its dead-center position with respect to the spring 156, and without interference between the cam member 149 and the arm 150. It is desired that when an attempt is made to operate any numeral key while the carriage is in zone "C" or zone "A," that is, when it is in position to type in any column 89, 92, 90 or 93, the numeral keys shall remain locked, and hence the typing of the "L" aforesaid in the proof-column will guard against errors that might arise from the entry of new items in a wrong account.

Provision is also made whereby the typing of said "L" in the proof-column also results in the setting of a device for releasing the numeral keys so that they may type items and totals in the "L" account, that is, when the carriage is in position to write in columns 88 and 91. This key-release or zone-release device is operated by the same cam 144 and rod 146 that have been referred to as effecting the locking of the numeral keys, since the arm 148 is pushed back by said rod, and rocks a shaft 158, which carries an upstanding controlling arm 159, for shifting a release cam 160 into the path of "L" tappet 161 upon the carriage. This tappet 161 is so adjusted along the rack 24 that it will strike said release cam 160 and depress the same (Figs. 8 and 15), and hold it down as long as the carriage is in position to write in either column 88 or 91, and thereby, by means of its vertical stem 162, (which slides in a yoke 162ᵃ carried by arm 159), depress an arm 163 which is carried upon a rock-shaft 164, the latter having an arm 165 connected by a forwardly-extending link 166 to an arm 167 which is carried upon said key-locking shaft 151, thereby withdrawing the dog 154 and releasing the numeral keys 1. The parts are now in the position seen at Fig. 8, where they are temporarily held, until tappet 161 releases the cam 160 and allows it to be returned by its spring 162ᵇ. At Fig. 8 the spring 156 is still urging the shaft 151 toward the key-locking position seen at Fig. 6, since the beveled cam 157 has not been moved as far as the dead-center position. Hence upon escape of the releasing cam 160 from the tappet 161, the temporary release of the keys will cease, as the spring 156 will return the dog 154 to its key-locking position seen at Fig. 6.

It will be understood that said releasing cam 160 need not normally be in the path of said "L" tappet 161, but in rear thereof, as seen in Fig. 14. The length of the cam or bar 160 is about equal to the width of a computing zone, that is, to the combined width of the columns 88 and 91; and the tappet is adjustable along the rack 24, which carries the usual tabulator-stops 23; but this tappet 161 may be cut away so as not to coöperate with any of the stops 23. Stops 23, if used only for tabulating purposes, need not be of such form as to engage the cam 160 at any time. Any tappet, if desired, may be provided with a portion to engage the decimal tabulator-stops 22, as indicated in dotted lines in Fig. 14. The "L" tappet 161 may be adjusted along the rack 24 to accommodate the position of columns 88, 91 upon the sheet, thus making it convenient to set up the machine to accommodate different kinds of sheets. The lower end of the releasing stem 162 is guided in a yoke 169 which is fixed upon the back of the tabulator-bracket 170 at the lower end thereof. The returning spring 162ᵇ normally holds a stop 171 on said stem 162 up against the guiding yoke 169.

Having written the new item 39.25 in column 88, the operator notes that the totalizer 4 shows a new balance 90.65, and proceeds to copy said new balance in balance-column 91 of account "L"; the machine being set to subtraction for this operation, so that in the ensuing action of the general operator, the amount 90.65L will be subtracted out of the balancing totalizer 4, whereby the latter is returned to zero position, together with the dummy wheel 105, as hereinbefore explained. This brings the cam wheel 143 to normal position, and spring 172 returns to normal position the aforesaid rod 146, the releasing cam 160 being restored by the same spring to its rearmost position. It has been explained that said releasing cam 160 in rocking said shaft 151 does not move the cam arm 157 thereon beyond dead center, so that whenever the releasing cam 160 is lifted by its spring 162ᵇ, the double-acting spring 156 restores the dog 154 to effective or key-locking position, and hence said dog remains in effective position, so far as the thrust rod 146 is concerned. However, there is provided a separate restorer, preferably in the form of a disk 173 having a projection 174 thereon, which, during the rotation of the dummy wheel 105 to normal position (at the operation of the general operator 52), strikes a projection 175 formed on the end of an arm 176, which forms part of a lever pivoted at 178, said lever also comprising a rearwardly-extending arm 177, which, during the just-mentioned movement of the general operator, lifts an arm 179 provided upon the rock-shaft 151 that controls the dog 154, and restores said rock-shaft to normal position, with the dog released; the double-acting spring 156 at this time riding over the point of the cam 157 on said rock-shaft 151, and thereafter holding the parts permanently in normal positions. It will be understood that at the initial advance of the members 105, 143, 173, the cam 174 on the disk or wheel 173 passed the projection 175 on the arm, so that the latter did not become an obstacle to the necessary operation of the dog-controlling rock-shaft 151 by the cam 149 upon the rod 146; in other words, as the dummy wheel 105 and the cam wheel 173 started to rotate, the projection 174 on the cam wheel 173 moved away from the projection 175 on the arm, leaving the latter free to move, together with the dog-controlling rock-shaft 151.

When, however, the special "C" (which is on the numeral "2" key) is typed at the end of an old balance in proof-column 94, and the dummy wheel 105 is accordingly turned two steps, a second cam 180 on said cam wheel engages the pin 145 on the rod 146 (which locks the keys as before), and drives said rod 146 and arm 148 far enough to swing the releasing cam or bar 160 out of the path of the "L" tappet 161 and into the path of the "C" tappet 181, which is out of line with tappet 161, as is clear from a comparison of Figs. 15 and 16, and is separated therefrom to an extent equal to the space occupied by a zone. Hence the keys will remain locked when the carriage is in the zone for typing or writing entries in the account "L," and also when in the zone for writing items in account "A," but they will be automatically unlocked whenever the carriage is in the zone for writing entries in the account "C," that is, in columns 89 and 92. The typing operations may now proceed in the same manner as explained for account "L." At the conclusion of entering the new balance in column 92, the special "C" key is operated, (the machine being set for subtraction), to affect the dummy wheel 105, so that the same will be restored by the general operator to normal position, together with the cam wheels 143, 173, and the parts controlled thereby.

When the special "A" (which is on the numeral "3" key) is typed at the end of an old balance in the proof-column, the dummy wheel 105 will be turned by the general operator three steps, and a third cam 182 upon said cam wheel 143 will engage the pin 145 upon rod 146, locking the keys as before (the key-locking cam 149 being sufficiently long to effect this for all rearward strokes of the rod 146), and the arm 148 will move far enough to shift the releasing cam or bar 160 out of the paths of zone tappets "L" and "C" and into the path of "A" tappet 183, which is out of line with "C" and "L," as at Fig. 17, and separated the distance of a zone from tappet 181. Hence the keys will be locked when the carriage is in the zones for typing amounts in accounts "L" and "C," but will be unlocked when it is in the zone to type items in the account "A," that is, in the columns 90 and 93. Upon the completion of the writing of the new balance in 93 and the typing of the special "A" at the end thereof, the general operator 52 will be able to control the restoration of the parts all to normal positions. It will be seen that the release cam 160 has four positions, one of them being normal (Fig. 14), and that the other positions thereof correspond with the three cams 144, 180, 182, respectively, the normal position of said release cam 160 keeping it clear of all tappets 161, 181, 183.

It is not desired for the keys to be locked when the carriage is in position for typing in columns 95, 96, 97 and 98, since no computation is done in these columns; and hence there is provided for these columns a special or permanent releasing cam or bar 184, which is always in position for operation by a special tappet 185, which is out of line with the tappets 161, 181, 183, Fig. 18. This permanent release cam 184 may be mounted upon arms 186 pivoted upon rod 187 and forming a bail, and one arm 186 may be provided with a downwardly-extending thrust bar or link 188, to bear down an arm 189 provided upon the temporary key-releasing rock-shaft 164. Bar or cam 184 is normally held up by a returning spring 190. When the carriage is carried over to the extreme right-hand portion of its travel, the releasing cam 184 is always effective, but at other portions of the travel the keys are locked, except when released by the zone cam 160.

In order that the operative may render the locking mechanism ineffective at will, so as to use the machine to print or compute numbers, or both, if desired, at a time when the locking mechanism has been rendered effective as a result of the printing of one of the special zone-indicating characters, there is provided a special release-key 191, connected to a link or plunger 192, having an offset portion or striker 193, adapted, when said key is depressed, to engage and move an arm 194 on the rock shaft 151. When the locking mechanism is rendered effective on the keys as a result of the printing of one of the special zone-indicating characters, the arm 194 is rotated within the range of movement of the striker 193. Depression of said key at this time will bring said striker into engagement with said rock arm and cause a rotation of the rock shaft 151, such as to operate the locking mechanism from its effective position, indicated in Fig. 6, to its ineffective position, as indicated in Fig. 8, thus releasing the number keys. On the release of said key, said locking mechanism will be returned by spring 156 from its Fig. 8 position to its Fig. 6 position, so as to relock said keys.

Variations may be resorted to within the scope of the invention, and portions of the improvements may be used without others.

Having thus described my invention, I claim:

1. In a combined printing and computing machine having a carriage movable into a succession of computing zones, and having settable indexing devices and a general operator, the combination with means having a part settable to coöperate with said general operator for disabling the computing mechanism while the carriage is in any of the computing zones, except a predetermined zone, of means also settable for coöperation with said general operator to restore the disabling means to normal ineffective condition.

2. In a key-controlled printing and computing machine having a carriage movable into a succession of computing zones, and also having settable indexing devices and a general operator, the combination with a key-locking device and a device dependent upon the travel of the carriage for releasing the keys in a predetermined zone, of an actuator for operating both said key-locking device and said releasing device, and means having a part settable for coöperation with said general operator, to enable the latter to control the operation of said actuator.

3. In a key-controlled printing and computing machine having a carriage movable into a succession of computing zones, and also having settable indexing devices and a general operator, the combination with a key-locking device and a device dependent upon the travel of the carriage for releasing the keys in a predetermined zone, of an actuator for operating both said key-locking device and said releasing device, means having a part settable for coöperation with said general operator, to enable the latter to control the operation of said actuator, and means also settable for co-operation with said general operator, for restoring said actuator to normal position together with said key-locking and releasing devices.

4. In a combined printing and computing machine having a carriage movable into a succession of computing zones, a set of numeral keys, indexing devices settable by said keys, and a general operator, the combination with a controller, of means under the control thereof for locking the keys and releasing them in any selected computing zone, and selectively settable means to enable said general operator to adjust said controller variably.

5. In a combined printing and computing machine having a carriage movable into a succession of computing zones, and also having settable indexing devices and a general operator, the combination with means, including tappet and cam members, relatively adjustable in a direction transverse to the travel of said carriage, and coöperating therewith, to control the state of the computing mechanism in a succession of zones, of a controller connected to effect different adjustments between said cam and tappet members, and selectively settable means to enable said general operator to adjust said controller variably.

6. In a combined printing and computing machine having a carriage movable into a succession of computing zones, and also having settable indexing devices and a general operator, the combination with means, including tappet and cam members, relatively adjustable in a direction transverse to the travel of said carriage, and coöperating therewith, to control the state of the computing mechanism in a succession of zones, of a controller connected to effect different adjustments between said cam and tappet members, selectively settable means to enable said general operator to adjust said controller variably, and selectively settable means to enable said general operator to restore said controller to normal position.

7. In a combined printing and computing machine having a carriage movable into a succession of computing zones, a set of numeral keys, indexing devices settable by said keys, and a general operator, the combination with a key-locking device, of means, including tappet and cam members, relatively adjustable in a direction transverse to the travel of said carriage, and coöperating therewith, to release the keys in any selected zone, a controller connected to effect different adjustments between said tappet and cam members and to move said key-locking device from normal to effective position, and selectively settable means to enable said general operator to adjust said controller variably.

8. In a combined printing and computing machine having a carriage movable into a succession of computing zones, a set of numeral keys, indexing devices settable by said keys, and a general operator, the combination with a normally ineffective key-locking device, of means, including cam and tappet members, to coöperate with said carriage for temporarily releasing the keys, and means settable for coöperation with said general operator for both operating said key-locking device and effecting relative adjustment of said cam and tappet members for releasing the keys temporarily in a certain zone.

9. In a combined printing and computing machine having a carriage movable into a succession of computing zones, a set of numeral keys, indexing devices settable by said keys, and a general operator, the combination with a normally ineffective key-locking device, of means, including cam and tappet members, to coöperate with said carriage for temporarily releasing the keys, means settable for coöperation with said general operator for both operating said key-locking device and effecting relative adjustment of said cam and tappet members for releasing the keys temporarily in a certain zone, and means, also settable for coöperation with said general operator, for restoring said key-locking device and said cam and tappet members to normal ineffective relative condition.

10. In a combined printing and computing machine having a carriage movable into a succession of computing zones, and also having settable indexing devices and a general operator, the combination with means, including cam and tappet members to coöperate with said carriage, for controlling the state of the computing mechanism in certain zones, of a device settable to coöperate with said general operator to effect relative adjustment of said cam and tappet members.

11. In a combined printing and computing machine having a carriage movable into a succession of computing zones, and also having settable indexing devices and a general operator, the combination with means, including cam and tappet members to coöperate with said carriage, for controlling the state of the computing mechanism in certain zones, of a device settable to coöperate with said general operator to effect relative adjustment of said cam and tappet members, and a settable device also coöperative with said general operator for restoring said cam and tappet members to normal ineffective relative condition.

12. In a combined printing and computing machine having a carriage movable into a succession of computing zones, and also having settable indexing devices and a general operator, the combination with means for disabling the computing mechanism, of a temporary restoring mechanism comprising cam and tappet members to coöperate with said carriage, and means for coöperation with the general operator for permanently restoring to normal ineffective condition the disabling means.

13. In a combined printing and computing mechanism, having a carriage movable into a succession of computing zones, and actuating mechanism therefor, including a general operator, the combination with a disabling mechanism for the computing mechanism, of tappet and cam members, means to enable said tappet and cam members to coöperate with said carriage to control the disabling of the computing mechanism in a predetermined zone, and means coöperative with said general operator for restoring said disabling mechanism to normal ineffective condition.

14. In a combined printing and computing mechanism having a carriage movable into a succession of computing zones, the combination with tappet and cam members normally ineffective during the travel of the carriage, of means to enable said tappet and cam members to coöperate with the carriage to control the disabling of the computing mechanism, and means connected to operate at an operation of the computing mechanism, for restoring said tappet and cam members to normal ineffective condition.

15. The combination with printing and computing mechanism, having a carriage movable into a succession of computing zones, of means, including tappet and cam members, for controlling the state of the computing mechanism in different zones, said tappet and cam members being relatively adjustable in a direction transverse to the travel of the carriage, and certain of said tappet and cam members being out of line with others and also arranged at intervals from one another along the run of the carriage, to permit predetermination of the state of the computing mechanism for successive zones.

16. In a combined printing and computing mechanism having a carriage movable into a succession of computing zones, in combination, means, including tappet and cam members, for controlling the state of the computing mechanism in different zones, certain of said tappet and cam members being out of line with others and also arranged at intervals from one another along the run of the carriage, and means for selectively effecting different relative adjustments of the tappet and cam members in a direction transverse to the travel of the carriage.

17. In a combined printing and computing mechanism having a carriage movable into a succession of computing zones, in combination, means, including tappet and cam members, for controlling the state of the computing mechanism in different zones, certain of said tappet and cam members being out of line with others and also arranged at intervals from one another along the run of the carriage, means for selectively effecting different relative adjustments of the tappet and cam members in a direction transverse to the travel of the carriage, and means effective at an operation of the computing mechanism, for restoring the tappet and cam members to normal ineffective condition.

18. In a combined printing and computing machine having a carriage movable into a succession of computing zones, the combination with an adjustably mounted cam, of means controlled thereby for determining the state of the computing mechanism, a series of tappets independently adjustable along the carriage and each out of line with the others, and means for shifting said cam to position to engage with any selected tappet.

19. In a combined printing and computing machine having a carriage movable into a succession of computing zones, the combination with an adjustably mounted cam, of means controlled thereby for determining the state of the computing mechanism, a series of tappets independently adjustable along the carriage and each out of line with the others, means for shifting said cam to position to engage with any selected tappet, and means effective at the operation of the computing mechanism, for restoring said cam to normal position out of range of any of said tappets.

20. In a combined printing and computing machine having numeral keys and a carriage movable into a succession of computing zones, the combination with a normally ineffective key-locking device, of means to render said key-locking device effective, means, including a cam and a tappet for coöperating with said cam and said carriage, for moving said key-locking device temporarily to ineffective position, and means dependent upon the operation of the computing mechanism, for returning said key-locking device permanently to ineffective position.

21. In a combined printing and computing machine having numeral keys and a carriage movable into a succession of computing zones, the combination with a normally ineffective key-locking device, of means to render said key-locking device effective, a cam, means controlled thereby for operating said key-locking device, a series of tappets spaced to correspond with said zones, means for selectively effecting different relative adjustments between said cam and said tappets transversely of the direction of carriage travel to enable said cam and any selected tappet to coöperate to render said key-locking device temporarily ineffective, and means, dependent upon the operation of the computing mechanism, for restoring said key-locking device permanently to normal position.

22. In a combined printing and computing machine having numeral keys and a carriage movable into a succession of computing zones, the combination with a normally ineffective key-locking device, of means to render said key-locking device effective, a cam, means controlled thereby for operating said key-locking device, a series of tappets spaced to correspond with said zones, means for selectively effecting different relative adjustments between said cam and said tappets transversely of the direction of carriage travel to enable said cam and any selected tappet to coöperte to render said key-locking device temporarily ineffective, and means, dependent upon the operation of the computing mechanism, for restoring said key-locking device permanently to normal position, and for restoring said cam and said tappets to normal relative adjustments.

23. In a combined printing and computing mechanism having a carriage movable into a succession of computing zones, numeral keys, a set of indexing devices settable by said keys, and a general operator, the combination with means for selecting any zone for computation, of means controlled by said general operator and controllable through said zone-selecting means, for locking the numeral keys against operation in any computing zone except the zone selected for computation.

24. In a combined printing and computing mechanism having a carriage movable into a succession of computing zones, numeral keys, a set of indexing devices settable by said keys, and a general operator, the combination with means for selecting any zone for computation, of means controlled by said general operator and controllable through said zone-selecting means, for locking the numeral keys against operation in any computing zone except the zone selected for computation, and means, including parts common to all of said zones, for unlocking said keys.

25. In a combined printing and computing mechanism having a carriage movable into a succession of computing zones, numeral keys, a set of indexing devices settable by said keys, and a general operator, the combination with means for selecting any zone for computation, of means controlled by said general operator and controllable through said zone-selecting means, for locking the numeral keys against operation in any computing zone except the zone selected for computation, and means coöperative with said general operator to be effective at a subsequent operation thereof, for returning said key-locking means to normal ineffective condition.

26. In a combined printing and computing mechanism having a carriage movable into a succesion of computing zones, a set of key-controlled indexing devices, and a general operator therefor, the combination with means for selecting any one of said zones for computation, of means controlled by said general operator for disabling the computing mechanism only as to the unselected zones.

27. In a combined printing and computing mechanism having a carriage movable into a succession of computing zones, a set of key-controlled indexing devices, and a general operator therefor, the combination with means for selecting any one of said zones for computation, of means controlled by said general operator for disabling the computing mechanism only as to the unselected zones, and means coöperative with said general operator to be effective at a subsequent operation thereof, for restoring said disabling means to normal ineffective condition.

28. In a combined printing and computing mechanism having a carriage movable into a succession of computing zones, the combination with a series of differentiated printing types, each representative of a different one of said computing zones, of means for selectively causing any of said types to print and for concomitantly disabling the computing mechanism as to all zones except the zone which is represented by the selected type.

29. In a combined printing and computing mechanism having a carriage movable into a succession of computing zones, the combination with a series of differentiated printing types, each representative of a different one of said computing zones, of means for selectively causing any of said types to print, and means for disabling the computing mechanism as to all zones except the zone which is represented by the selected type, said last-mentioned means including parts common to all of said zones, for restoring the disabling means to its normal ineffective condition.

30. In a combined printing and computing mechanism having a carriage movable into a succession of computing zones, the combination with a series of differentiated printing types, each representative of a different one of said computing zones, of means for selectively causing any of said types to print, and means for disabling the computing mechanism as to all zones except the zone which is represented by the selected type, said last-mentioned means being called into action by the operation of the computing mechanism, and including parts common to all of said zones, for returning the disabling means to its normal ineffective condition.

31. In a combined printing and computing mechanism having a carriage movable into a succession of computing zones, the combination with manually controllable means settable to disable the computing mechanism as to any selected zone while permitting it to operate for another zone, of means dependent upon the operation of the computing mechanism and effective for all of said zones, for automatically restoring said disabling means to normal ineffective condition.

32. In a combined printing and computing mechanism having a carriage movable into a succession of computing zones, the combination with manually controllable means selectively settable to disable the computing mechanism as to any zone while permitting it to operate for another zone, of means, including parts common to all the zones, for restoring the disabling means to its normal ineffective condition.

33. In a combined printing and computing mechanism having a carriage movable into a succession of computing zones, the combination with a type, of means to cause said type to print, and means connected to said printing means for disabling the computing mechanism in certain of said zones, while permitting operation of the computing mechanism in certain of the remaining zones.

34. In a combined printing and computing mechanism having a carriage movable into a succession of computing zones, the combination with a type, of menas to cause said type to print, means connected to said printing means for disabling the computing mechanism in certain of said zones, while permitting operation of the computing mechanism in certain of the remaining zones, and means dependent upon the operation of the computing mechanism for rendering said disabling means ineffective.

35. In a combined printing and computing mechanism having a carriage movable into a succession of computing zones, the combination with differentiated types, each representative of a different one of said zones, of means for causing any selected one of said types to print, and means for concomitantly disabling the computing mechanism as to the zones represented by the remaining type or types only.

36. In a combined printing and computing mechanism having a carriage movable into a succession of computing zones, the combination with differentiated types, each representative of a different one of said zones, of means for causing any selected one of said types to print, means for concomitantly disabling the computing mechanism as to the zones represented by the remaining type or types only, and means dependent upon the operation of the computing mechanism for restoring said disabling means to ineffective condition.

37. In a key-controlled printing and computing mechanism having a carriage movable into and out of several computing zones, the combination with means for disabling the computing mechanism, of means, selectively controllable at the keyboard, for rendering said disabling means ineffective for any selected computing zone to the exclusion of other computing zones.

38. In a key-controlled printing and computing mechanism having a carriage movable into and out of several computing zones, the combination with means for disabling the computing mechanism, of means, selectively controllable at the keyboard, for rendering said disabling means ineffective for any selected computing zone to the exclusion of other computing zones, and means effective at the operation of the computing mechanism for restoring said disabling means to normal ineffective condition.

39. In a combined printing and computing machine having a carriage, numeral keys and computing mechanism controllable by said keys, the combination with means for locking the keys against actuation, of means for automatically releasing the keys during the travel of the carriage through a computing zone, said locking means being effective during the travel of the carriage through another computing zone, whereby printing and computing of numbers in the wrong zones may be prevented.

40. In a combined printing and computing machine having a carriage and means controlled thereby for determining printing and computing zones, the combination with number keys for controlling the operation of said printing and computing mechanism, of means for selectively and automatically locking the keys against actuation, except during the travel of the carriage through any selected one of different computing zones.

41. In a combined printing and computing machine having a carriage and means controlled thereby for determining printing and computing zones, the combination with number keys for controlling the operation of said printing and computing mechanism, of means for selectively and automatically locking the keys against actuation, except during the travel of the carriage through any selected one of different computing zones, and means dependent upon the operation of the computing mechanism for restoring the keys to normal released condition.

42. In a combined printing and computing machine having numeral types and a traveling carriage movable through a succession of computing zones, the combination with means for locking the numeral keys, of means settable to position to release the keys in any computing zone to the exclusion of the other computing zones.

43. In a combined printing and computing machine having printing mechanism, computing mechanism, number keys common to both said mechanisms, a carriage, and means controlled thereby for determining printing and computing zones, the combination with means for locking said keys, of means for releasing said keys including a key-releasing cam and a series of tappets out of line with each other, said carriage being connected to effect relative movement, in a direction parallel with its own direction of travel, between said releasing cam and said series of tappets, and means for effecting relative movement in a direction transverse to the carriage travel to bring said releasing cam under the control of any selected tappet.

44. In a combined printing and computing machine having printing mechanism, computing mechanism, number keys common to both said mechanisms, a carriage, and means controlled thereby for determining printing and computing zones, the combination with means for locking said keys, of means for releasing said keys including a key-releasing cam and a series of tappets out of line with each other, said carriage being connected to effect relative movement, in a direction parallel with its own direction of travel, between said releasing cam and said series of tappets, means for effecting relative movement in a direction transverse to the carriage travel to bring said releasing cam under the control of any selected tappet, and means dependent upon the operation of the computing mechanism for restoring the transversely moved member to normal ineffective position, free from control by any of said tappets.

45. In a combined printing and computing machine having numeral keys, a carriage, and means controlled thereby for determining printing and computing zones, the combination with a plurality of differentiated character-printing types, each representative of a different zone, and means for selectively causing said types to print, of means for locking the numeral keys against actuation, a normally ineffective device for releasing the numeral keys, tappets out of line with each other and each capable of engaging a variably settable part of said releasing device to enable said carriage to control the releasing of the keys, said tappets being located at intervals to correspond with different computing zones, and means, controlled by the selective operation of said printing means to print a character representative of one of said zones, for selectively moving the variably settable part of said releasing device into position to be engageable only by the tappet corresponding with the zone represented by the character printed.

46. In a combined printing and computing machine having numeral keys, a carriage, and means controlled thereby for determining printing and computing zones, the combination with a plurality of differentiated character-printing types, each representative of a different zone, and means for selectively causing said types to print, of means for locking the numeral keys against actuation, a normally ineffective device for releasing the numeral keys, tappets out of line with each other and each capable of engaging a variably settable part of said releasing device to enable said carriage to control the releasing of the keys, said tappets being located at intervals to correspond with different computing zones, means, controlled by the selective operation of said printing means to print a character representative of one of said zones, for selectively moving the variably settable part of said releasing device into position to be engageable only by the tappet corresponding with the zone represented by the character printed, and means, dependent upon the operation of the computing mechanism, for restoring said key-locking means to normal ineffective position.

47. In a combined printing and computing machine having numeral keys, a carriage, and means controlled thereby for determining printing and computing zones, the combination with a plurality of differentiated character-printing types, each representative of a different zone, of manually controllable selective means for causing any of said types to print its character and for concomitantly locking the numeral keys against actuation, a normally ineffective device for releasing the numeral keys, tappets corresponding respectively with said printing types, each of said tappets being mounted on said carriage in a position out of line with the others, and each capable of being brought into engagement with an adjustable part of said releasing device, so as to enable said carriage to control the releasing of the keys, said tappets being located at intervals to correspond with the different computing zones, and means, controlled by said selective type-printing means, for causing the adjustable part of said releasing device to be moved to a position to be engageable only by the tappet corresponding with the zone represented by the character printed.

48. In a combined printing and computing machine having numeral keys, a carriage, and means controlled thereby for determining printing and computing zones, the combination with a plurality of differentiated character-printing types, each representative of a different zone, of manually controllable selective means for causing any of said types to print its character and for concomitantly locking the numeral keys against actuation, a normally ineffective device for releasing the numeral keys, tappets corresponding respectively with said printing types, each of said tappets being mounted on said carriage in a position out of line with the others, and each capable of being brought into engagement with an adjustable part of said releasing device, so as to enable said carriage to control the releasing of the keys, said tappets being located at intervals to correspond with the different computing zones, means, controlled by said selective type-printing means, for causing the adjustable part of said releasing device to be moved to a position to be engageable only by the tappet corresponding with the zone represented by the character printed, and means, dependent upon the operation of the computing mechanism, for restoring said key-locking means and the adjustable part of said key-releasing device to normal ineffective position.

49. In a combined printing and computing machine having numeral keys, a carriage, and means controlled thereby for determining printing and computing zones, the combination with a variably settable zone-selector, of means controlled by said selector when operated to lock the numeral keys against actuation, a normally ineffective device for releasing said keys, a plurality of zone-selecting tappets, each mounted on said carriage in a position out of line with the others, and each capable of being brought into engagement with an adjustable part of said releasing device, so as to enable said carriage to control the releasing of the keys, said tappets being located at intervals to correspond with the different computing zones, and means controlled by the operation of said zone-selector for causing the adjustable part of said releasing device to be moved to a position to be engageable only by the tappet corresponding with a particular zone as predetermined by the setting of said zone-selector.

50. In a combined printing and computing machine having numeral keys, a carriage, and means controlled thereby for determining printing and computing zones, the combination with a variably settable zone-selector, of means controlled by said selector when operated to lock the numeral keys against actuation, a normally ineffective device for releasing said keys, a plurality of zone-selecting tappets, each mounted on said carriage in a position out of line with the others, and each capable of being brought into engagement with an adjustable part of said releasing device, so as to enable said carriage to control the releasing of the keys, said tappets being located at intervals to correspond with the different computing zones, means controlled by the operation of said zone-selector for causing the adjustable part of said releasing device to be moved to a position to be engageable only by the tappet corresponding with a particular zone as predetermined by the setting of said zone-selector, and means, dependent upon the operation of the computing mechanism, for restoring the key-locking means to normal ineffective position.

51. In a combined printing and computing machine having numeral keys, a carriage, and means controlled thereby for determining printing and computing zones, the combination with a variably settable zone-selector, of means controlled by said selector when operated to lock the numeral keys against actuation, a normally ineffective device for releasing said keys, a plurality of zone-selecting tappets, each mounted on said carriage in a position out of line with the others, and each capable of being brought into engagement with an adjustable part of said releasing device, so as to enable said carriage to control the releasing of the keys, said tappets being located at intervals to correspond with the different computing zones, means controlled by the operation of said zone-selector for causing the adjustable part of said releasing device to be moved to a position to be engageable only by the tappet corresponding with a particular zone as predetermined by the setting of said zone-selector, and means, dependent upon the operation of the computing mechanism, for restoring the key-locking means and the adjustable part of said key-releasing device to normal ineffective position.

52. In a combined printing and computing machine having numeral keys, a carriage, and means controlled thereby for determining printing and computing zones, the combination with a variably settable zone-selector, of means controlled by said selector when operated to lock the numeral keys against actuation, a normally ineffective device for releasing said keys, a plurality of zone-selecting tappets, each mounted on said carriage in a position out of line with the others, and each capable of being brought into engagement with an adjustable part of said releasing device, so as to enable said carriage to control the releasing of the keys, said tappets being located at intervals to correspond with the different computing zones, means controlled by the operation of said zone-selector for causing the adjustable part of said releasing device to be moved to a position to be engageable only by the tappet corresponding with a particular zone as predetermined by the setting of said zone-selector, and means, dependent upon the operation of the computing mechanism, for restoring the adjustable part of said key-releasing device to normal ineffective position.

53. In a combined printing and computing machine having numeral keys and a carriage, the combination with means for selectively printing on a work-sheet any one of a plurality of special characters to designate a corresponding one of a plurality of different computing zones, of means controlled by said printing means, for selectively preventing computation in any of said zones except the one so designated.

54. In a combined printing and computing machine having a carriage, numeral keys, computing mechanism to coöperate with said keys, and a general operator, the combination with means for locking said keys against actuation, of key-releasing means including a cam, a series of tappets, each out of line with the others, said carriage being connected to effect relative movement between said cam and said series of tappets, and means operable by said general operator for bringing said cam under the control of any selected tappet.

55. In a combined printing and computing machine having a carriage, numeral keys, computing mechanism to coöperate with said keys, and a general operator, the combination with means for locking said keys against actuation, of key-releasing means including a cam, a series of tappets each out of line with the others, said carriage being connected to effect relative movement between said cam and said series of tappets, means operable by said general operator for bringing said cam under the control of any selected tappet, and means dependent upon a subsequent movement of the general operator for restoring said cam to normal position and for releasing the keys.

56. In a combined printing and computing machine having a carriage, numeral keys, and a computing mechanism, the combination with means for manually and selectively printing special differentiated characters upon a work-sheet, each of said characters being representative of a different one of a plurality of computing zones, of means for concomitantly and automatically preventing operation of the numeral keys in a computing zone other than the one selected at the operation of said printing means.

57. The combination with a combined printing and computing machine having numeral keys, a traveling carriage and means controlled by said carriage for determining computing zones, of means settable for locking said keys against actuation in one of said zones, and for rendering said locking means ineffective in another of said zones.

58. The combination with a combined printing and computing machine having numeral keys, a traveling carriage and means controlled by said carriage for determining computing zones, of means variably settable for selectively locking said keys against actuation in any two only of at least three zones.

59. In a combined printing and computing machine having a carriage movable into a succession of computing zones, and also having numeral keys, indexing devices settable by said keys, and a general operator, the combination with mechanism for locking said keys, of mechanism to variably coöperate with said carriage for temporarily unlocking said keys, and variably settable means for establishing an operative connection between said general operator and said locking and unlocking mechanisms, said connection being effective, on operation of said general operator, to move said key-locking mechanism to effective position, and to selectively position a part of said unlocking mechanism in coöperative relation with said carriage.

60. In a combined printing and computing machine having a carriage movable into a succession of computing zones, and also having numeral keys, indexing devices settable by said keys, and a general operator, the combination with mechanism for locking said keys, of mechanism to variably coöperate with said carriage for temporarily unlocking said keys, variably settable means for establishing an operative connection between said general operator and said locking and unlocking mechanisms, said connection being effective, on operation of said general operator, to move said key-locking mechanism to effective position, and to selectively position a part of said unlocking mechanism in coöperative relation with said carriage, and means, also settable for coöperation with said general operator, for restoring to normal ineffective condition the key-locking mechanism and the releasing mechanism.

61. In a combined printing and computing mechanism having a carriage movable into a succession of computing zones, numeral keys to control movements of said carriage, indexing devices settable by said keys, and a general operator, the combination with key-locking means, of a device settable to enable said general operator to render said key-locking means effective, and means capable of being brought into coöperative relation with said carriage for releasing said key-locking means in a selected zone.

62. In a combined printing and computing mechanism having a carriage movable into a succession of computing zones, numeral keys to control movements of said carriage, indexing devices settable by said keys, and a general operator, the combination with key-locking means, of a device settable to enable said general operator to render said key-locking means effective, means capable of being brought into coöperative relation with said carriage for releasing said key-locking means in a selected zone, and means settable for coöperation with said general operator to restore said key-locking means permanently to ineffective position.

63. In a combined printing and computing mechanism having a carriage movable into a succession of computing zones, numeral keys to control movements of said carriage, indexing devices settable by said keys, and a general operator, the combination with key-locking means, of means, including tappet and cam members, to coöperate with said carriage to release the keys temporarily in a selected zone, and means, settable selectively, to cause said general operator, when operated, both to render said key-locking means effective and to also effect a selective relative adjustment of said tappet and cam members determinative of a release of said keys in the selected one of said zones.

64. In a combined printing and computing mechanism having a carriage movable into a succession of computing zones, numeral keys to control movements of said carriage, indexing devices settable by said keys, and a general operator, the combination with key-locking means, of means, including tappet and cam members, to coöperate with said carriage to release the keys temporarily in a selected zone, means, settable selectively, to cause said general operator, when operated, both to render said key-locking means effective, and to also effect a selective relative adjustment of said tappet and cam members determinative of a release of said keys in the selected one of said zones, and means, selectively settable, for coöperation with said general operator for restoring the tappet and cam members to their normal ineffective relative condition, and for restoring the key-locking means to normal ineffective condition.

65. In a combined printing and computing machine having a carriage movable into a succession of computing zones, numeral keys, indexing devices settable thereby, and a general operator, the combination with means for locking said keys, of means, including tappet and cam members, for releasing said keys in different zones, certain of said tappet and cam members being out of line with others, and also arranged at intervals from one another along the run of the carriage, and means, selectively settable for coöperation with said general operator, to effect any predetermined relative adjustment of said tappet and cam members, in a direction transverse to the travel of the carriage, to predetermine the locked or released state of said keys for different zones.

66. In a combined printing and computing machine having a carriage movable into a succession of computing zones, numeral keys, indexing devices settable thereby, and a general operator, the combination with means for locking said keys, of means, including tappet and cam members, for releasing said keys in different zones, certain of said tappet and cam members being out of line with others, and also arranged at intervals from one another along the run of the carriage, means, selectively settable for coöperation with said general operator, to effect any predetermined relative adjustment of said tappet and cam members, in a direction transverse to the travel of the carriage, to predetermine the locked or released state of said keys for different zones, and means, also selectively settable for coöperation with said general operator, for restoring the key-locking and releasing means to normal ineffective condition.

67. In a combined printing and computing mechanism having a carriage movable into a succession of computing zones, and also having indexing devices and a general operator, the combination with means, including tappet and cam members, for controlling the state of the computing mechanism in different zones, of selectively settable means to enable said general operator to effect different relative adjustments of said tappet and cam members in a direction transverse to the travel of the carriage to predetermine the state of the computing mechanism in successive zones, certain of said tappet and cam members being out of line with others and also arranged at intervals from one another along the run of the carriage to correspond with the location of the respective zones.

68. In a combined printing and computing machine having a carriage movable into a succession of computing zones, and having indexing devices and a general operator, the combination with variably settable means to control the state of the computing mechanism in a succession of zones, of selectively settable controlling means, coöperative with said general operator, to enable said general operator to effect the operation of said means for controlling the state of the computing mechanism in accordance with the selective setting of said controlling means.

69. In a combined printing and computing machine having a carriage movable into a succession of computing zones, and having indexing devices and a general operator, the combination with variably settable means to control the state of the computing mechanism in a succession of zones, of selectively settable controlling means, coöperative with said general operator, to enable said general operator to effect the operation of said means for controlling the state of the computing mechanism in accordance with the selective setting of said controlling means, and means, also selectively settable, and coöperative with said general operator, for restoring said state-determining means to normal condition.

70. In a combined printing and computing machine having a carriage movable into a succession of computing zones, and also having settable indexing devices and a general operator, the combination with a cam, of means controlled thereby for determining the state of the computing mechanism, a series of tappets, independently adjustable in the direction of the carriage travel, and each out of line with the others, and means to enable said general operator to shift said cam to position to engage with any selected tappet.

71. In a combined printing and computing machine having a carriage movable into a succession of computing zones, and also having settable indexing devices and a general operator, the combination with a cam, of means controlled thereby for determining the state of the computing mechanism, a series of tappets, independently adjustable in the direction of the carriage travel, and each out of line with the others, means to enable said general operator to shift said cam to position to engage with any selected tappet, and means, also selectively settable for coöperation with said general operator, for restoring said cam to normal position out of range of any of said tappets.

72. In a combined printing and computing machine having printing and computing mechanism including numerals keys, actuating mechanism for said computing mechanism, and a general operator, the combination with a normally ineffective key-locking device, of means settable to enable said general operator to render said key-locking device effective.

73. In a combined printing and computing machine having printing and computing mechanism including numeral keys, actuating mechanism for said computing mechanism, and a general operator, the combination with a normally ineffective key-locking device, of means settable to enable said general operator to render said key-locking device effective, and means for temporarily releasing said keys.

74. In a combined printing and computing machine having printing and computing mechanism including numeral keys, actuating mechanism for said computing mechanism, and a general operator, the combination with a normally ineffective key-locking device, of means settable to enable said general operator to render said key-locking device effective, and means, also settable for coöperation with said general operator, for restoring said key-locking device to normal ineffective condition.

75. In a combined printing and computing machine having printing and computing mechanism including numeral keys, a carriage movable into a succession of computing zones, actuating mechanism for said computing mechanism, and a general operator, the combination with a normally ineffective key-locking device, of means settable to enable said general operator to render said key-locking device effective, and means dependent upon the movement of said carriage for temporarily releasing said keys in a selected zone.

76. In a combined printing and computing machine having printing and computing mechanism including numeral keys, actuating mechanism for said computing mechanism, and a general operator, the combination with a normally ineffective key-locking device, of means settable to enable said general operator to render said key-locking device effective, means for temporarily releasing said keys, and means, also settable for coöperation with said general operator, for restoring said key-locking device to normal ineffective condition.

77. In a combined printing and computing machine, the combination with mechanism for selectively printing numbers in a plurality of different zones on a work-sheet and for computing the numbers thus printed, of means for printing a special character in one of said zones indicative of a zone within which a number to be computed is to be printed, means controlled by said special character-printing means for disabling said printing and computing mechanism, so as to prevent its operation to compute a number and print the same in a zone other than the one thus indicated, and means, controlled by said special character-printing means, for rendering said disabling means ineffective, so as to permit the number to be computed and printed within the zone indicated by said special character.

78. In a combined printing and computing machine, the combination with mechanism for selectively printing numbers in a plurality of different zones on a work-sheet and for computing the numbers thus printed, of means for printing a special character in one of said zones indicative of a zone within which a number to be computed is to be printed, means controlled by said special character-printing means for disabling said printing and computing mechanism, so as to prevent its operation to compute a number and print the same in a zone other than the one thus indicated, means, controlled by said special character-printing means, for rendering said disabling means ineffective, so as to permit the number to be computed and printed within the zone indicated by said special character, and restoring means, rendered effective by a second operation of said special character-printing means, for returning said disabling means to normal ineffective condition.

79. In a combined printing and computing machine, the combination with mechanism for selectively printing numbers in a plurality of different zones on a work-sheet and for computing the numbers thus printed, of means for printing a special character in one of said zones indicative of a zone within which a number to be computed is to be printed, means controlled by said special character-printing means for disabling said printing and computing mechanism, so as to prevent its operation to compute a number and print the same in a zone other than the one thus indicated, means, controlled by said special character-printing means, for rendering said disabling means ineffective, so as to permit the number to be computed and printed within the zone indicated by said special character, and restoring means rendered effective by a second operation of said special character-printing means, for returning said means for rendering said disabling means ineffective, to normal ineffective position.

80. In a combined printing and computing machine, the combination with mechanism for selectively printing numbers in a plurality of different zones on a work-sheet and for computing the numbers thus printed, of means for selectively printing in one of said zones any one of a plurality of differentiated characters, each indicative of a different zone in which a number computed may be printed, means controlled by said character-printing means when caused to print a selected one of said zone-indicating characters, for disabling said printing and computing mechanism, so as to prevent its operation to compute a number and print the same in a zone other than that indicated by the character selected, and means, controlled by said zone-indicating character-printing means, for rendering said disabling means ineffective, so as to permit the number to be computed and printed within the zone indicated by the selected character.

81. In a combined printing and computing machine, the combination with mechanism for selectively printing numbers in a plurality of different zones on a work-sheet and for computing the numbers thus printed, of means for selectively printing in one of said zones any one of a plurality of differentiated characters, each indicative of a different zone in which a number computed may be printed, means controlled by said character-printing means when caused to print a selected one of said zone-indicating characters, for disabling said printing and computing mechanism, so as to prevent its operation to compute a number and print the same in a zone other than that indicated by the character selected, means, controlled by said zone-indicating character-printing means, for rendering said disabling means ineffective, so as to permit the number to be computed and printed within the zone indicated by the selected character, and restoring means, rendered effective by a second operation of the same zone-indicating character-printing means to print said character in the indicated zone, for returning said disabling means and its controlling means to normal ineffective condition.

82. In a combined printing and computing machine, the combination with mechanism for selectively printing numbers in a plurality of different zones on a work-sheet, and for computing numbers thus printed, said mechanism including a traveling carriage and means controlled thereby for determining said zones, of means capable of being variably and selectively operated, when said carriage is in a position determinative of one of said zones, for disabling said number-printing and computing mechanism, and means, controlled in part by the selective operation of said disabling means, and in part by the position of said carriage, for rendering said disabling means ineffective while said carriage passes through a particular computing zone, predetermined by the selective operation of said disabling means, so as to permit a number to be computed and printed within that zone to the exclusion of others.

83. In a combined printing and computing machine, the combination with mechanism for selectively printing numbers in a plurality of different zones on a work-sheet, and for computing numbers thus printed, said mechanism including a traveling carriage and means controlled thereby for determining said zones, of means capable of being variably and selectively operated, when said carriage is in a position determinative of one of said zones, for disabling said number-printing and computing mechanism, means, controlled in part by the selective operation of said disabling means, and in part by the position of said carriage, for rendering said disabling means ineffective while said carriage passes through a particular computing zone, predetermined by the selective operation of said disabling means, so as to permit a number to be computed and printed within that zone to the exclusion of others, and means, capable of being operated by said computing mechanism when effecting a computation, for restoring said disabling means and its controlling means to normal condition.

84. In a combined printing and computing machine, the combination with mechanism for selectively printing numbers in a plurality of different zones on a worksheet, and for computing numbers thus printed, said mechanism including a traveling carriage and means controlled thereby for determining said zones, of a variably settable zone-selecting device, means, rendered effective by said zone-selecting device, when operated, for locking said number-printing and computing mechanism, and lock-releasing means, including parts controlled in part by said carriage, and dependent upon its zonal position, for rendering said locking means ineffective, said lock-releasing means also including a part, variably settable in accordance with the selective operation of said zone-selecting device, for predetermining the particular zone in which said carriage-controlled parts shall be operated, said zone-selecting device and said carriage-controlled lock-releasing means thus affording means for permitting a number to be computed and printed within a predetermined zone to the exclusion of others.

85. In a combined printing and computing machine, the combination with printing mechanism, computing mechanism, number keys common to both of said mechanisms, and means for setting said computing mechanism for computations of different character, of key-locking mechanism, controlled by one of said keys when said computing mechanism is set for one character of computation, for locking said number keys, and lock-releasing mechanism, controlled by the same key when said computing mechanism is set for a different character of computation, for restoring said locking mechanism to normal condition, so as to release said keys.

86. In a combined printing and computing machine, the combination with printing mechanism, computing mechanism, number keys common to both of said mechanisms, and means for setting said computing mechanism for computations of different character, of key-locking mechanism, including controlling means settable by one of said keys when said computing mechanism is set for one character of computation, for locking said keys, and lock-releasing mechanism, including controlling means settable by the same key when said computing mechanism is set for a different character of computation, for restoring said locking mechanism to normal condition, so as to release said keys.

87. In a combined printing and computing machine, the combination with printing mechanism, computing mechanism normally set for addition, number keys common to both of said mechanisms, and means for setting said computing mechanism for subtraction, of key-locking mechanism, controlled by one of said keys when said computing mechanism is set for addition, for locking said number keys, and lock-releasing mechanism, controlled by the same key when said computing mechanism is set for subtraction, for restoring said locking mechanism to normal condition, so as to release said keys.

88. In a combined printing and computing machine, the combination with printing mechanism, computing mechanism normally set for addition, number keys common to both of said mechanisms, and means for setting said computing mechanism for subtraction, of key-locking mechanism, including controlling means settable by one of said keys when said computing mechanism is set for addition, for locking said number keys, and lock-releasing mechanism, including controlling means settable by the same key when said computing mechanism is set for subtraction, for restoring said locking mechanism to normal condition, so as to release said keys.

89. In a combined printing and computing machine, the combination with printing mechanism, computing mechanism, and number keys common to both said mechanisms, of normally ineffective mechanism for locking said number keys to render said number-printing and computing mechanisms ineffective, means for selectively rendering said locking mechanism effective and for restoring the same to its normal ineffective condition, a special character-printing device, and means controlled by said lock-controlling means for locking said special character-printing device when said locking mechanism is rendered effective, and for releasing said special character-printing device when said locking mechanism is restored to its normal ineffective condition, so that the printing of said character serves as an indication that said number-printing and computing mechanisms are free to be operated.

90. In a combined printing and computing machine, the combination with mechanism for selectively printing numbers in a plurality of different zones on a work-sheet and for computing the numbers thus printed, said mechanism including a traveling carriage and means controlled thereby for determining said zones, of a variably settable zone-selecting device, means rendered effective by said device, when selectively operated in accordance with any one of a plurality of settings, for disabling said number-printing and computing mechanism, means, controlled in part by said zone-selecting device, and in part by the zonal position of said carriage, for rendering said disabling means temporarily ineffective while said carriage is passing through a computing zone predetermined by the selective setting of said zone-selecting device, so as to permit a number to be computed and printed within that zone, to the exclusion of others, a special character-printing device, means, rendered effective by said zone-selecting device when operated to select a zone, for locking said special character-printing device, and means, capable of being rendered effective by a second setting and operation of said zone-selecting device, for returning said disabling means to its normal, ineffective condition, said zone-selecting device being also thereby returned to its normal position, and thus unlocking said special character-printing device, so that said special character may be printed to indicate that said number-printing and computing mechanism is in normal operative condition.

91. In a combined printing and computing machine, the combination with number-printing mechanism and computing mechanism comprising a plurality of computing sections and a non-computing section, of a device for printing a clearance-character, means controlled by said non-computing section for disabling said number-printing and computing mechanisms, and means also controlled by said non-computing section for disabling said clearance character-printing device, both of said disabling means being rendered ineffective when said non-computing section is in its normal condition, so that a printing of said clearance character serves as a means to indicate that said number-printing and computing mechanisms are free to be operated.

92. In a combined printing and computing machine, the combination with number-printing mechanism and computing mechanism comprising a plurality of computing sections and a non-computing section, of a device for printing a clearance-character, means controlled by each of said computing sections, except when in condition to cause a zero to be exhibited, for disabling said clearance-character-printing device, means controlled by said non-computing section, when operated, for disabling said number-printing and computing mechanisms, and means also controlled by said non-computing section, when operated, for disabling said clearance-character printing device, both of said last-mentioned disabling means being rendered ineffective when said non-computing section is restored to normal condition, so that a printing of said clearance character may serve as an indication that said computing mechanism stands at zero and that said number-printing and computing mechanisms are free to be operated.

93. In a combined printing and computing machine, the combination with printing mechanism, computing mechanism, a traveling carriage, and means controlled by said carriage for determining computing and printing zones, said computing mechanism including a non-computing zone-selecting section, of means controlled by said non-computing section, when operated, for predetermining a zone in which a number may be computed and printed and for disabling said number-printing and computing mechanisms, so as to prevent the printing and computing of numbers in another zone, means controlled by said non-computing section, when restored to normal condition, for rendering said disabling means ineffective, means for printing a clearance character, means controlled by each of said computing sections for locking said clearance-character printing means, except when said section is in a condition to indicate zero, and means controlled by said non-computing section, when operated to select a zone, for locking said clearance-character printing means and for releasing the same when restored to normal condition, so that the printing of the clearance character may serve as an indication that said computing mechanism stands at zero and that the number-printing and computing mechanisms are free to be operated.

94. In a combined printing and computing machine, the combination with printing mechanism, computing mechanism, number keys common to said mechanisms, a traveling carriage, and means controlled by said carriage for determining computing and printing zones, said computing mechanism including a non-computing zone-selecting section, of means, controlled by case-shift mechanism, for effecting the printing of a special zone-indicating character by the operation of one of said number keys, means, controlled in part by the position of said carriage, and in part by said key, when so operated, for effecting a zone-selecting setting of said non-computing section, means rendered effective by said non-computing section, when operated, for disabling said number-printing and computing mechanisms, and means, controlled in part by the zone-selecting setting of said non-computing section, and in part by the position of said carriage, for rendering said disabling means ineffective while said carriage passes through the zone indicated by the character printed, so as to permit a number to be computed and printed in said zone to the exclusion of another.

95. In a combined printing and computing machine, the combination with printing mechanism, computing mechanism, number keys common to said mechanisms, a traveling carriage, and means controlled by said carriage for determining computing and printing zones, said computing mechanism including a non-computing zone-selecting section, of means, controlled by case-shift mechanism, for effecting the printing of a special zone-indicating character, by the operation of one of said number keys, means, controlled in part by the position of said carriage, and in part by said key, when so operated, for effecting a zone-selecting setting of said non-computing section, means rendered effective by said non-computing section, when operated, for disabling said number printing and computing mechanisms, means, controlled in part by the zone-selecting setting of said non-computing section, and in part by the position of said carriage, for rendering said disabling means ineffective while said carriage passes through the zone indicated by the character printed, so as to permit a number to be computed and printed in said zone to the exclusion of another, and means controlled by the operation of said key to print said character in the selected zone, followed by a second operation of said non-computing section, for restoring said disabling means and its controlling means to non-effective condition.

96. In a combined printing and computing machine, the combination with printing mechanism, computing mechanism, number keys common to said mechanisms, a traveling carriage, and means controlled by said carriage for determining computing and printing zones, said computing mechanism including a non-computing zone-selecting section, and each of a plurality of said number keys being provided with means, controlled in part by case-shift mechanism, for printing a differentiated zone-indicating character, of means, controlled in part by the position of said carriage, and in part by any one of said character-printing keys, when so operated, for effecting a selective zone-selecting setting of said non-computing section corresponding to the particular key operated, means rendered effective by said non-computing section, when so operated by any of said character-printing keys, for disabling said number printing and computing mechanisms and means, controlled in part by the zone-selecting setting of said non-computing section, and in part by the position of said carriage, for rendering said disabling means ineffective while said carriage passes through the particular zone indicated by the printed zone-indicating character, so as to permit a number to be computed and printed in said zone to the exclusion of another.

97. In a combined printing and computing machine, comprising printing mechanism, computing mechanism, a carriage, and means controlled by said carriage for determining a non-computing printing zone and a computing printing zone, the combination, with means for disabling said printing and computing mechnisms, of means controlled by the positioning of said carriage in said non-computing printing zone, for rendering and maintaining said disabling means ineffective while the carriage is in that zone.

98. In a combined printing and computing machine, comprising printing mechanism, computing mechanism, a carriage, and means controlled by said carriage for determining a non-computing printing zone and a computing printing zone, the combination with means for disabling said printing and computing mechanisms, of means controlled by the positioning of said carriage in said non-computing printing zone, for rendering and maintaining said disabling means ineffective while the carriage is in that zone, said carriage-controlled means being incapable of rendering said disabling means ineffective when said carriage is in said computing printing zone.

99. In a combined printing and computing machine, comprising printing and computing mechanisms having a common set of number keys, a traveling carriage, and means controlled by said carriage, for determining a non-computing printing zone and a computing printing zone, the combination with means for locking said keys, of means controlled by the positioning of said carriage in said non-computing printing zone, for releasing and maintaining said keys released while said carriage is in that zone.

100. In a combined printing and computing machine, comprising printing and computing mechanisms having a common set of number keys, a traveling carriage, and means controlled by said carriage, for determining a non-computing printing zone and a computing printing zone, the combination with means for locking said keys, of means controlled by the positioning of said carriage in said non-computing printing zone, for releasing and maintaining said keys released while said carriage is in that zone, said carriage-controlled releasing means being ineffective to maintain said keys released when said carriage is in said computing printing zone.

101. In a combined printing and computing machine, comprising printing mechanism, computing mechanism, actuating mechanism for said computing mechanism, a carriage, and means, controlled by said carriage, for determining a non-computing printing zone and a computing printing zone, the combination with means for disabling said computing and printing mechanisms, of means, capable of being set for operation by said actuating mechanism, to render said disabling means effective, and means, controlled by the positioning of said carriage in said non-computing printing zone, for rendering and maintaining said disabling means ineffective while said carriage is in that zone.

102. In a combined printing and computing machine, comprising printing mechanism, computing mechanism, actuating mechanism for said computing mechanism, a carriage, and means controlled by said carriage for determining a non-computing printing zone and a computing printing zone, the combination with means for disabling said computing and printing mechanisms, of means, capable of being set for operation by said actuating mechanism, to render said disabling means effective, and means, controlled by the positioning of said carriage in said non-computing printing zone, for rendering and maintaining said disabling means ineffective while said carriage is in that zone, said carriage-controlled means being incapable of maintaining said disabling means in ineffective condition when said carriage is in said computing printing zone.

103. In a combined printing and computing machine, comprising printing and computing mechanisms having a common set of number keys, actuating mechanism for said computing mechanism, a carriage, and means, controlled by said carriage, for determining a non-computing printing zone and a computing printing zone, the combination with key-locking means, of means, capable of being set for operation by said actuating mechanism, for rendering said key-locking means effective, and means, controlled by the positioning of said carriage in said non-computing printing zone, for rendering and maintaining said key-locking means ineffective while said carriage is in that zone.

104. In a combined printing and computing machine, comprising printing mechanism, computing mechanism, a carriage, and means, controlled by said carriage, for determining a non-computing printing zone and a plurality of computing printing zones, the combination with means for disabling said printing and computing mechanisms, of means, controlled by the positioning of said carriage in said non-computing printing zone, for rendering and maintaining said disabling means ineffective while said carriage is in that zone, and selectively settable means, variably controlled in accordance with the positioning of said carriage, for rendering and maintaining said disabling means ineffective in a selected one of said computing printing zones to the exclusion of others.

105. In a combined printing and computing machine, comprising printing and computing mechanisms having a common set of number keys, actuating mechanism for said computing mechanism, a carriage, and means, controlled by said carriage, for determining a non-computing printing zone and a plurality of computing printing zones, the combination with key-locking means, of means, capable of being set by an operation of said actuating mechanism, for rendering said key-locking means effective, means, controlled by the positioning of said carriage in said non-computing printing zone, for rendering and maintaining said key-locking means ineffective while said carriage is in that zone, and selectively settable means, variably controlled by the positioning of said carriage, for rendering and maintaining said key-locking means ineffective when said carriage is positioned in a selected one of said computing printing zones to the exclusion of others.

106. In a combined printing and computing machine, comprising computing and printing mechanisms having a common set of number keys, actuating mechanism for said computing mechanism, a carriage, and means, controlled by said carriage, for determining a non-computing printing zone and a plurality of computing printing zones, the combination with means for locking said keys, of key-releasing means for rendering said locking means ineffective, an adjustably mounted cam, means controlled by said cam for rendering said key-releasing means effective, a non-adjustable cam, means controlled thereby for rendering said key-releasing means effective, a tappet on said carriage, to coöperate with said non-adjustable cam, a plurality of tappets on said carriage, to coöperate with said adjustably mounted cam, each of said last-mentioned tappets being positioned out of line with the other, and the different tappets of the group being spaced along said carriage in positions corresponding with different computing printing zones, and a zone-selector variably settable for operation by said actuating mechanism, for rendering said key-locking means effective, and for effecting a movement of said adjustably mounted cam transversely of the direction of movement of said carriage, and so as to position it in coöperative relation with a selected one of the tappets of said group, said non-adjustable cam, and the means coöperating therewith, being effective, on positioning said carriage in said non-computing printing zone, to render and maintain said key-releasing means effective while said carriage is in that zone, and said adjustably mounted cam, and the means cooperating therewith, being effective, on positioning said carriage in a particular one of said computing printing zones, determined by the adjustment of said selector, to render and maintain said key-releasing means effective while the carriage is in that zone, to the exclusion of other computing printing zones, in which said key-locking means remains effective.

107. In combination, a computing mechanism including numeral keys, a carriage movable into a succession of computing zones relative to said computing mechanism, a numeral-key-locking device, a device for releasing said numeral-key-locking device settable to effective condition for certain predetermined zones, and means whereby the numeral-key-locking device may be rendered effective and the releasing device may be set to effective condition for a predetermined zone concomitantly.

108. In combination, a carriage movable into a succession of computing zones, a set of numeral keys, computing mechanism controlled by said carriage and said keys, numeral-key-locking means, normally ineffective releasing means for said numeral-key-locking means settable to effective condition for predetermined zones, and means whereby said numeral-key-locking means may be rendered effective and said releasing means may be set to effective condition for a predetermined zone concomitantly.

109. In combination, computing mechanism, a carriage movable into a succession of computing zones relative to said computing mechanism, normally ineffective means for disabling the computing mechanism, restoring mechanism selectively settable to render said disabling means ineffective for predetermined zones, and means whereby said disabling means may be rendered effective and said restoring mechanism set for a predetermined zone concomitantly.

BURNHAM C. STICKNEY.

Witnesses:
CATHERINE A. NEWELL,
EDITH B. LIBBEY.